United States Patent
Zhao et al.

(10) Patent No.: US 11,895,512 B2
(45) Date of Patent: Feb. 6, 2024

(54) COMMUNICATION METHOD, COMMUNICATION APPARATUS, AND STORAGE MEDIUM

(71) Applicant: HUAWEI TECHNOLOGIES CO., LTD., Guangdong (CN)

(72) Inventors: Jing Zhao, Shenzhen (CN); Huisheng Li, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 285 days.

(21) Appl. No.: 17/388,560

(22) Filed: Jul. 29, 2021

(65) Prior Publication Data

US 2021/0360442 A1 Nov. 18, 2021

Related U.S. Application Data

(63) Continuation of application No. PCT/CN2019/123393, filed on Dec. 5, 2019.

(30) Foreign Application Priority Data

Jan. 30, 2019 (CN) .......................... 201910093578.9

(51) Int. Cl.
*H04W 24/02* (2009.01)
*H04L 41/12* (2022.01)

(52) U.S. Cl.
CPC ............ *H04W 24/02* (2013.01); *H04L 41/12* (2013.01)

(58) Field of Classification Search
CPC ... H04W 76/15; H04W 48/16; H04W 40/205; H04W 24/10; H04W 56/003;
(Continued)

(56) References Cited

U.S. PATENT DOCUMENTS 11,228,880 B2 * 1/2022 Aldana ................. H04W 28/16
11,381,445 B2 * 7/2022 Parkvall ............ H04W 52/0229
(Continued)

FOREIGN PATENT DOCUMENTS

CN  102695253 A  9/2012
CN  104853392 A  8/2015
(Continued)

OTHER PUBLICATIONS

Extended European Search Report issued in European Application No. 19913725.8 dated Feb. 24, 2022, 10 pages.
(Continued)

*Primary Examiner* — Jung Liu
(74) *Attorney, Agent, or Firm* — Fish & Richardson P.C.

(57) ABSTRACT

The present disclosure discloses example communication method and apparatus. One example method includes a first network device receiving first state information from at least one second network device, where the first state information indicates whether the at least one second network device is capable of providing a service in a next state. Third state information of the at least one second network device is received, where the third state information indicates a current state of the at least one second network device and includes user state information corresponding to at least a portion of a plurality of beamforming weight directions of the at least one second network device. A network topology is determined based on at least the first state information and the third state information, and after the first network device and the at least one second network device in a next state are networked.

18 Claims, 12 Drawing Sheets

State 1

(58) Field of Classification Search
CPC ..... H04W 88/04; H04W 92/20; H04W 28/22; H04W 36/0088; H04W 72/51; H04W 4/80; H04W 36/08; H04W 12/069; H04W 8/005; H04W 72/23; H04W 4/40; H04W 4/08; H04W 28/16; H04W 36/0085; H04W 74/0808; H04B 7/0695; H04B 7/088; H04B 7/15528
See application file for complete search history.

(56) References Cited

U.S. PATENT DOCUMENTS

| | | | | |
|---|---|---|---|---|
| 2009/0080375 | A1* | 3/2009 | Jalil | H04W 24/02 370/329 |
| 2012/0058757 | A1* | 3/2012 | Cancer Abreu | H04Q 3/00 455/423 |
| 2014/0018057 | A1* | 1/2014 | Yu | H04W 52/0206 455/418 |
| 2017/0331670 | A1* | 11/2017 | Parkvall | H04W 24/10 |
| 2022/0078865 | A1* | 3/2022 | Novlan | H04W 76/15 |
| 2022/0353650 | A1* | 11/2022 | Aldana | H04W 28/22 |

FOREIGN PATENT DOCUMENTS

| | | |
|---|---|---|
| CN | 107294582 A | 10/2017 |
| CN | 108234169 A | 6/2018 |
| CN | 108811033 A | 11/2018 |
| CN | 108934036 A | 12/2018 |
| CN | 109246752 A | 1/2019 |
| CN | 106165469 B | 7/2019 |
| EP | 3297211 A1 | 3/2018 |
| WO | 2011071470 A1 | 6/2011 |

OTHER PUBLICATIONS

Office Action in Chinese Application No. 201910093578.9, dated Jul. 1, 2021, 6 pages.
Office Action in Chinese Application No. 201910093578.9, dated Jan. 26, 2021, 44 pages.
PCT International Search Report and Written Opinion in International Application No. PCT/CN2019/123393, dated Mar. 4, 2020, 15 pages.

* cited by examiner

State 1

State 2

COMMUNICATION METHOD, COMMUNICATION APPARATUS, AND STORAGE MEDIUM

CROSS-REFERENCE TO RELATED APPLICATIONS

This application is a continuation of International Application No. PCT/CN2019/123393, filed on Dec. 5, 2019, which claims priority to Chinese Patent Application No. 201910093578.9, filed on Jan. 30, 2019. The disclosures of the aforementioned applications are hereby incorporated by reference in their entireties.

TECHNICAL FIELD

This application relates to the field of communication technologies, and in particular, to a communication method, a communication apparatus, and a storage medium.

BACKGROUND

In a mobile communication system, a network device, for example, a base station, communicates with a terminal, to implement a mobile communication service. Because both a location and coverage of the base station are relatively fixed, a network topology obtained after a plurality of base stations are networked is relatively fixed.

In a conventional technology, the network topology may be changed by manually adjusting the location of the base station, but this reduces flexibility of the network topology, and increases manual maintenance costs.

SUMMARY

This application provides a communication method, a communication apparatus, and a storage medium, to improve flexibility of a network topology and reduce manual maintenance costs of a base station.

According to a first aspect, this application provides a communication method, where the method includes: A first network device receives, from at least one second network device, first state information used to indicate whether the second network device is capable of providing a service in a next state; and the first network device determines, based on at least the first state information, a network topology obtained after the first network device and the at least one second network device in the next state are networked. According to the solution provided in this embodiment, the network topology may change with time, thereby improving flexibility of the network topology, and reducing manual maintenance costs caused by manual adjustment of a location of a base station.

In a possible design, the first state information is determined by the second network device based on at least one of an electric quantity, online user state information, load information, a signal-to-noise ratio, and a throughput that are of the second network device.

In a possible design, that the first network device determines, based on at least the first state information, a network topology obtained after the first network device and the at least one second network device in the next state are networked includes: The first network device determines, based on second state information and the first state information, a target network device that is in the first network device and the at least one second network device and that provides a service in the next state, where the second state information is used to indicate whether the first network device is capable of providing a service in the next state.

In a possible design, the first network device may further send the second state information to the at least one second network device, so that the at least one second network device determines, based on the first state information and the second state information, the target network device that is in the first network device and the at least one second network device and that provides the service in the next state. According to the solution provided in this embodiment, each network device in the networking may determine the target network device that provides the service in the next state, so that the network topology may change with time, thereby improving flexibility of the network topology.

In a possible design, the first state information is periodically sent by the second network device, and the second state information is periodically sent by the first network device; and a sending cycle of the first state information is the same as a sending cycle of the second state information.

In a possible design, before that the first network device determines, based on at least the first state information, a network topology obtained after the first network device and the at least one second network device in the next state are networked, the method further includes: The first network device receives third state information of the at least one second network device, where the third state information is used to indicate a current state of the second network device; and that the first network device determines, based on at least the first state information, a network topology obtained after the first network device and the at least one second network device in the next state are networked includes: The first network device determines, based on the first state information and the third state information, the network topology obtained after the first network device and the at least one second network device in the next state are networked. According to the solution provided in this embodiment, the network topology may change with time, thereby improving flexibility of the network topology. In addition, the first network device and the at least one second network device do not need to exchange information. When a quantity of network devices that are networked is relatively large, network congestion caused by a large quantity of information sending and receiving can be effectively avoided.

In a possible design, the third state information includes at least one of the following: an electric quantity, online user state information, load information, a signal-to-noise ratio, a throughput, and user state information corresponding to at least a portion of a plurality of beamforming weight directions that are of the second network device.

In a possible design, the determining a network topology obtained after the first network device and the at least one second network device in the next state are networked includes: determining a target network device that is in the first network device and the at least one second network device and that provides a service in the next state.

In a possible design, after the determining a target network device that is in the first network device and the at least one second network device and that provides a service in the next state, the method further includes: determining, based on user state information corresponding to at least a portion of a plurality of beamforming weight directions of the target network device, at least one of a beamforming weight direction, waveform information, and location information that are of the target network device in the next state.

In a possible design, before that the first network device receives third state information of the at least one second network device, the method further includes: The first network device sends configuration information to the at least one second network device, where the configuration information is used to indicate the at least one second network device to send the third state information to the first network device.

In a possible design, the configuration information is used to indicate a same second network device to send different third state information to the first network device.

In a possible design, the configuration information is used to indicate a plurality of different second network devices to send different third state information to the first network device.

In a possible design, the first network device and the at least one second network device belong to a first group.

In a possible design, the method further includes: The first network device sends the first state information to a third network device in a second group. According to the solution provided in this embodiment, communication overheads can be reduced, and a data amount of information processed by each base station can be reduced, so that timely information collection can be achieved.

In a possible design, levels of network devices in the first group are the same, levels of network devices in the second group are the same, and the levels of the network devices in the first group are different from the levels of the network devices in the second group.

In a possible design, a level of the first network device is adjacent to a level of the third network device.

In a possible design, levels of a portion of network devices in the first group are the same, and levels of a portion of network devices in the second group are the same.

In a possible design, the method further includes: The first network device sends the first state information to a fourth network device in the first group, where a level of the first network device is adjacent to a level of the fourth network device.

In a possible design, the level of the first network device and a level of the third network device are the same.

In a possible design, information exchange cycles between network devices of a same level are positively related to the level.

According to a second aspect, this application provides a communication apparatus, where the communication apparatus includes a receiving module and a processing module. The receiving module is configured to receive first state information from at least one second network device, where the first state information is used to indicate whether the second network device is capable of providing a service in a next state. The processing module is configured to determine, based on at least the first state information, a network topology obtained after the first network device and the at least one second network device in the next state are networked.

In a possible design, the first state information is determined by the second network device based on at least one of an electric quantity, online user state information, load information, a signal-to-noise ratio, and a throughput that are of the second network device.

In a possible design, when determining, based on at least the first state information, the network topology obtained after the first network device and the at least one second network device in the next state are networked, the processing module is specifically configured to determine, based on second state information and the first state information, a target network device that is in the first network device and the at least one second network device and that provides a service in the next state, where the second state information is used to indicate whether the first network device is capable of providing a service in the next state.

In a possible design, the communication apparatus further includes a sending module. The sending module is configured to send the second state information to the at least one second network device, so that the at least one second network device determines, based on the first state information and the second state information, the target network device that is in the first network device and the at least one second network device and that provides the service in the next state.

In a possible design, the first state information is periodically sent by the second network device, and the second state information is periodically sent by the first network device; and a sending cycle of the first state information is the same as a sending cycle of the second state information.

In a possible design, the receiving module is further configured to receive third state information of the at least one second network device, where the third state information is used to indicate a current state of the second network device. When determining, based on at least the first state information, the network topology obtained after the first network device and the at least one second network device in the next state are networked, the processing module is specifically configured to determine, based on the first state information and the third state information, the network topology obtained after the first network device and the at least one second network device in the next state are networked.

In a possible design, the third state information includes at least one of the following: an electric quantity, online user state information, load information, a signal-to-noise ratio, a throughput, and user state information corresponding to at least a portion of a plurality of beamforming weight directions that are of the second network device.

In a possible design, when determining the network topology obtained after the first network device and the at least one second network device in the next state are networked, the processing module is specifically configured to determine a target network device that is in the first network device and the at least one second network device and that provides a service in the next state.

In a possible design, the processing module is further configured to determine, based on user state information corresponding to at least a portion of a plurality of beamforming weight directions of the target network device, at least one of a beamforming weight direction, waveform information, and location information that are of the target network device in the next state.

In a possible design, the sending module is further configured to: before the receiving module receives the third state information of the at least one second network device, send configuration information to the at least one second network device, where the configuration information is used to indicate the at least one second network device to send the third state information to the first network device.

In a possible design, the configuration information is used to indicate a same second network device to send different third state information to the first network device.

In a possible design, the configuration information is used to indicate a plurality of different second network devices to send different third state information to the first network device.

In a possible design, the first network device and the at least one second network device belong to a first group.

In a possible design, the first network device sends the first state information to a third network device in a second group.

In a possible design, levels of network devices in the first group are the same, levels of network devices in the second group are the same, and the levels of the network devices in the first group are different from the levels of the network devices in the second group.

In a possible design, a level of the first network device is adjacent to a level of the third network device.

In a possible design, levels of a portion of network devices in the first group are the same, and levels of a portion of network devices in the second group are the same.

In a possible design, the sending module is further configured to send the first state information to a fourth network device in the first group, where a level of the first network device is adjacent to a level of the fourth network device.

In a possible design, the level of the first network device and a level of the third network device are the same.

In a possible design, information exchange cycles between network devices of a same level are positively related to the level.

According to a third aspect, this application provides a communication apparatus, including a processor and a transceiver. The processor and the transceiver communicate with each other by using an internal connection. The transceiver is configured to receive first state information from at least one second network device, where the first state information is used to indicate whether the second network device is capable of providing a service in a next state. The processor is configured to determine, based on at least the first state information, a network topology obtained after the first network device and the at least one second network device in the next state are networked.

In a possible design, the first state information is determined by the second network device based on at least one of an electric quantity, online user state information, load information, a signal-to-noise ratio, and a throughput that are of the second network device.

In a possible design, when determining, based on at least the first state information, the network topology obtained after the first network device and the at least one second network device in the next state are networked, the processor is specifically configured to determine, based on second state information and the first state information, a target network device that is in the first network device and the at least one second network device and that provides a service in the next state, where the second state information is used to indicate whether the first network device is capable of providing a service in the next state.

In a possible design, the transceiver is further configured to send the second state information to the at least one second network device, so that the at least one second network device determines, based on the first state information and the second state information, the target network device that is in the first network device and the at least one second network device and that provides the service in the next state.

In a possible design, the first state information is periodically sent by the second network device, and the second state information is periodically sent by the first network device; and a sending cycle of the first state information is the same as a sending cycle of the second state information.

In a possible design, the transceiver is further configured to receive third state information of the at least one second network device, where the third state information is used to indicate a current state of the second network device. When determining, based on at least the first state information, the network topology obtained after the first network device and the at least one second network device in the next state are networked, the processor is specifically configured to determine, based on the first state information and the third state information, the network topology obtained after the first network device and the at least one second network device in the next state are networked.

In a possible design, the third state information includes at least one of the following: an electric quantity, online user state information, load information, a signal-to-noise ratio, a throughput, and user state information corresponding to at least a portion of a plurality of beamforming weight directions that are of the second network device.

In a possible design, when determining the network topology obtained after the first network device and the at least one second network device in the next state are networked, the processor is specifically configured to determine a target network device that is in the first network device and the at least one second network device and that provides a service in the next state.

In a possible design, the processor is further configured to determine, based on user state information corresponding to at least a portion of a plurality of beamforming weight directions of the target network device, at least one of a beamforming weight direction, waveform information, and location information that are of the target network device in the next state.

In a possible design, the transceiver is further configured to: before receiving the third state information of the at least one second network device, send configuration information to the at least one second network device, where the configuration information is used to indicate the at least one second network device to send the third state information to the first network device.

In a possible design, the configuration information is used to indicate a same second network device to send different third state information to the first network device.

In a possible design, the configuration information is used to indicate a plurality of different second network devices to send different third state information to the first network device.

In a possible design, the first network device and the at least one second network device belong to a first group.

In a possible design, the first network device sends the first state information to a third network device in a second group.

In a possible design, levels of network devices in the first group are the same, levels of network devices in the second group are the same, and the levels of the network devices in the first group are different from the levels of the network devices in the second group.

In a possible design, a level of the first network device is adjacent to a level of the third network device.

In a possible design, levels of a portion of network devices in the first group are the same, and levels of a portion of network devices in the second group are the same.

In a possible design, the transceiver is further configured to send the first state information to a fourth network device in the first group, where a level of the first network device is adjacent to a level of the fourth network device.

In a possible design, the level of the first network device and a level of the third network device are the same.

In a possible design, information exchange cycles between network devices of a same level are positively related to the level.

According to a fourth aspect, this application provides a communication apparatus, including:
an interface and a processor, where the interface is coupled to the processor; and
the processor is configured to perform the method according to the first aspect.

In a possible design, the communication apparatus in the fourth aspect may be a network device, or may be a chip. The interface and the processor may be integrated on a same chip, or may be separately disposed on different chips.

According to a fifth aspect, this application provides a communication apparatus, including a processor, where the processor is coupled to a memory;
the memory is configured to store a computer program; and
the processor is configured to execute the computer program stored in the memory, to enable the communication apparatus to perform the method according to the first aspect.

According to a sixth aspect, this application provides a communication apparatus, including a processor, a memory, and a transceiver, where
the memory is configured to store a computer program; and
the processor is configured to execute the computer program stored in the memory, to enable the communication apparatus to perform the method according to the first aspect.

According to a seventh aspect, this application provides a computer-readable storage medium, where the computer-readable storage medium stores a computer program; and when the computer program runs on a computer, the computer is enabled to perform the method according to the first aspect.

According to an eighth aspect, this application provides a computer program, including a program or instructions, where when the program or the instructions are run on a computer, the method according to the first aspect is performed.

In a possible design, all or some of the computer programs in the eighth aspect may be stored in a storage medium encapsulated with a processor, or some or all of the programs may be stored in a memory that is not encapsulated with a processor.

According to a ninth aspect, this application provides a processor, where the processor includes at least one circuit, configured to perform the method according to the first aspect.

According to a tenth aspect, this application provides a communication apparatus, including:
a memory and a processor, where the memory is coupled to the processor, and
the processor is configured to perform the method according to the first aspect.

In a possible design, the communication apparatus in the tenth aspect may be a network device, or may be a chip. The memory and the processor may be integrated on a same chip, or may be separately disposed on different chips.

According to an eleventh aspect, an embodiment of this application further provides a communication system, where the communication system includes the first network device and the at least one second network device according to the first aspect.

It can be learned that in the foregoing aspects, after the first network device and the at least one second network device are networked, the first network device and the at least one second network device predict, in a current state, whether the first network device and the at least one second network device are capable of providing services in the next state. The first network device receives, from the at least one second network device, first state information used to indicate whether the second network device is capable of providing the service in the next state; and determines, based on at least the first state information, the network topology obtained after the first network device and the at least one second network device in the next state are networked, so that the network topology can change with time, thereby improving flexibility of the network topology, and reducing manual maintenance costs caused by manual adjustment of the location of the base station.

DESCRIPTION OF EMBODIMENTS

Terms used in implementations of this application are merely intended to explain specific embodiments of this application, and are not intended to limit this application.

Figure 1:
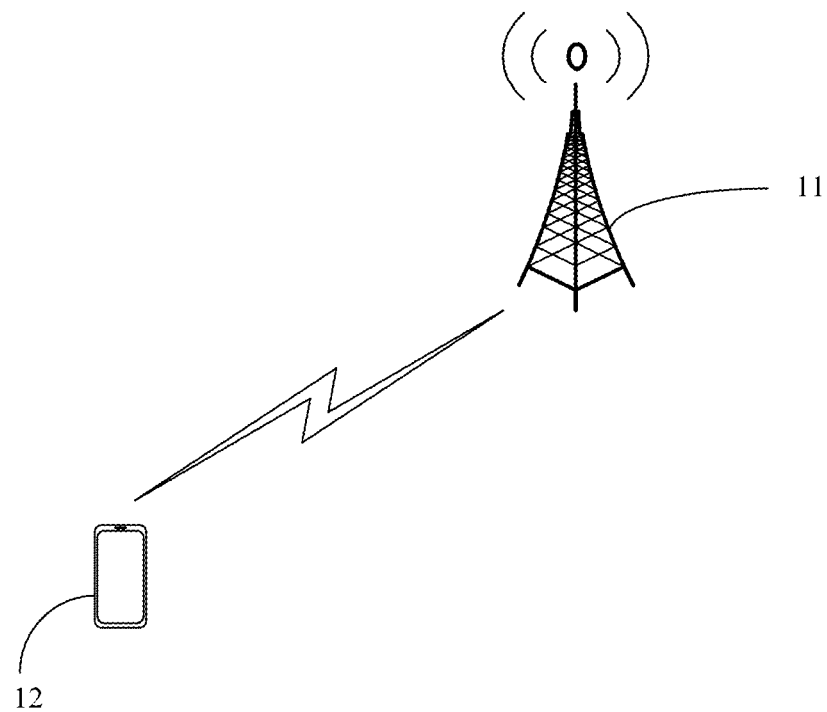
FIG. 1 is a schematic diagram of an application scenario according to an embodiment of this application.

Embodiments of this application may be applied to various types of communication systems. FIG. 1 is a schematic diagram of an application scenario according to an embodiment of this application. As shown in FIG. 1, a communication system mainly includes a network device 11 and a terminal 12.

(1) The network device 11 may be a network side device, for example, an access point (AP) of a wireless local area network (WLAN), an evolved NodeB (eNB or eNodeB) of 4G, or a base station for next generation communication, for example, a 5G new radio access technology (NR) base station (next generation Node B, gNB), a small cell, or a micro cell, or may also be a relay station, a transmission and reception point (TRP), a roadside unit (RSU), or the like. In this embodiment, communication systems of different communication standards have different base stations. For distinction, a base station in a 4G communication system is referred to as a long term evolution (LTE) eNB, and a base station in a 5G communication system is referred to as an NR gNB. A base station that supports both the 4G communication system and the 5G communication system is referred to as an evolved long term evolution (eLTE) eNB. These names are only for ease of differentiation, but are not limited in meaning.

(2) The terminal 12 is also referred to as user equipment (UE), and is a device that provides voice and/or data connectivity for a user, for example, a handheld device with a wireless connection function, a vehicle-mounted device, or a vehicle with a vehicle to vehicle (V2V) communication capability. A common terminal includes, for example, a mobile phone, a tablet, a notebook computer, a palmtop computer, a mobile internet device (MID), and a wearable device such as a smartwatch, a smart band, or a pedometer.

(3) "A plurality of" indicates two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

It should be noted that, a quantity and types of the terminals 12 included in the communication system shown in FIG. 1 are merely examples, and this embodiment of this application is not limited thereto. For example, more terminals 12 that communicate with the network device 11 may be further included. For brevity, details are not described in the accompanying drawings. In addition, in the communication system shown in FIG. 1, although the network device 11 and the terminal 12 are shown, the communication system may include but is not limited to the network device 11 and the terminal 12, for example, may further include a core network node or a device configured to carry a virtualized network function. This is obvious to a person skilled in the art, and details are not described herein.

In addition, the embodiments of this application may not only be applied to a 4G wireless communication system represented by long term evolution (LTE), subsequent evolution of the LTE, and the like, but may also be applied to a next-generation wireless communication system, that is, the 5G communication system, and may be applied to another system that may appear in the future, for example, a next-generation Wi-Fi network and 5G internet of vehicles.

It should be noted that, with continuous evolution of the communication system, names of the foregoing network elements may change in another system that may appear in the future. In this case, the solutions provided in the embodiments of this application are also applicable.

Figure 2:
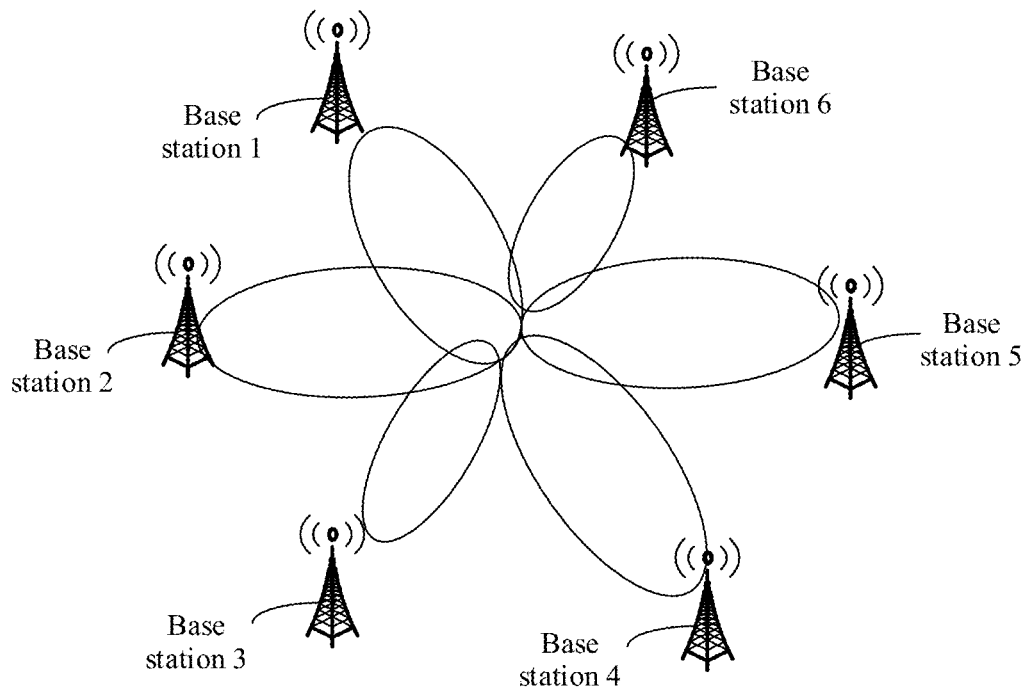
FIG. 2 is a schematic diagram of another application scenario according to an embodiment of this application.

Usually, a base station is a fixed base station, that is, the base station cannot move after being installed, and coverage of the base station is relatively fixed. FIG. 2 is a schematic diagram of another application scenario according to an embodiment of this application. As shown in FIG. 2, a base station 1, a base station 2, a base station 3, a base station 4, a base station 5, and a base station 6 are networked together. Locations of the six base stations are set during installation, and cannot be moved. In addition, coverage of the base stations is relatively fixed. In this way, a network topology obtained after the six base stations are networked is also relatively fixed, thereby reducing flexibility of the network topology. If the network topology needs to be changed, the location of the base station is usually manually adjusted, to enable the base station to reach a preset location for service, which increases manual maintenance costs. In addition, because a terminal is movable, the location and the coverage of the base station are relatively fixed, a phenomenon that a terminal in coverage of a base station has moved out of the coverage of the base station, but the base station is still providing a service may occur, resulting in a waste of network resources. To address the foregoing problem, this application provides a method for communication between base stations. The base stations may communicate with each other, to adjust a network topology, so that the network topology becomes more intelligent. The following describes the communication method with reference to a specific embodiment. In addition, the base station may be specifically a macro base station, or may be a micro base station. In this embodiment of this application, the micro base station is used as an example for description.

Figure 3:
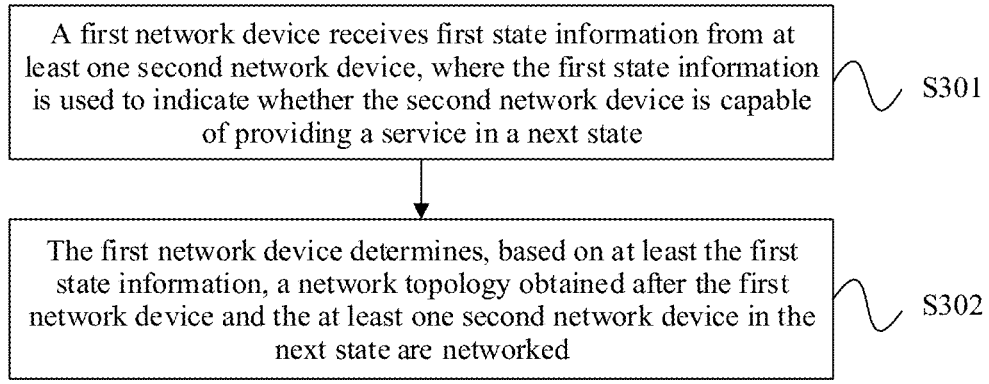
FIG. 3 is a flowchart of a communication method according to this application.

FIG. 3 is a flowchart of a communication method according to this application. As shown in FIG. 3, the communication method in this embodiment includes the following steps.

Step S301: A first network device receives first state information from at least one second network device, where the first state information is used to indicate whether the second network device is capable of providing a service in a next state.

Figure 4:
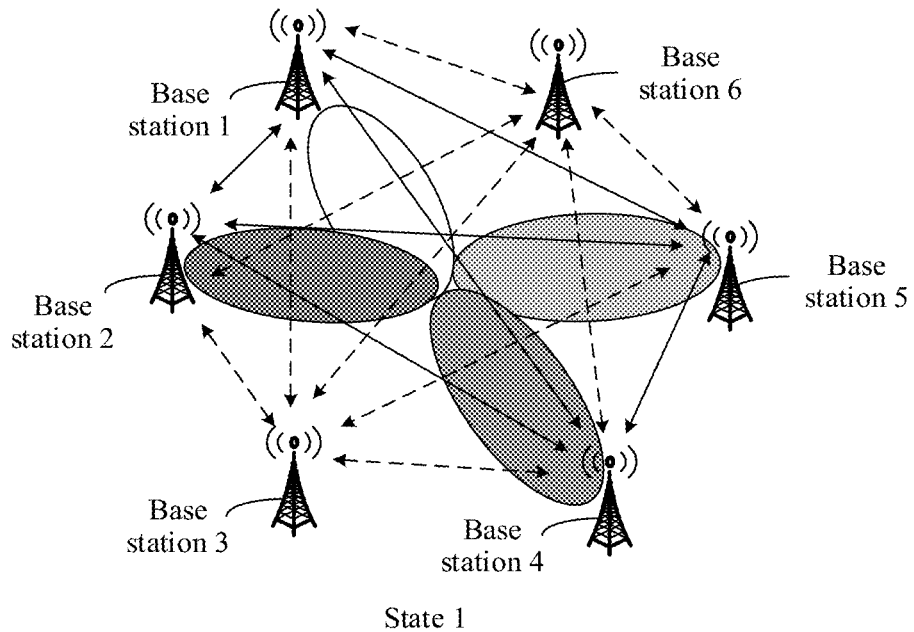
FIG. 4 is a schematic diagram of another application scenario according to an embodiment of this application.

As shown in FIG. 4, a base station 1, a base station 2, a base station 3, a base station 4, a base station 5, and a base station 6 are networked together to provide services for a terminal. The first network device may be any one of the six base stations, for example, the base station 1. Several other base stations in the six base stations other than the base station 1, for example, the base station 2, the base station 3, the base station 4, the base station 5, and the base station 6 may be denoted as second network devices.

In a current state, namely, a state 1 shown in FIG. 4, the base station 1, the base station 2, the base station 4, and the base station 5 provide services, and the base station 3 and the base station 6 do not provide services. In a possible manner, base stations in the six base stations communicate with each other. For example, the base station 1 separately communicates with the base station 2, the base station 3, the base station 4, the base station 5, and the base station 6; the base station 2 separately communicates with the base station 1, the base station 3, the base station 4, the base station 5, and the base station 6; and so on. Information exchanged between the base stations may be next state information predicted by each base station in a current state, and the next state information of each base station is used to indicate whether the base station is capable of providing a service in the next state.

At a moment in the state 1, each of the six base stations may determine, based on at least one of a current electric quantity, online user state information, load information, a signal-to-noise ratio, and a throughput that are of the base station, whether the base station is capable of providing the service in the next state. For example, the current electric quantity is used as an example. If the electric quantity currently stored by the base station is lower than a switching threshold by 20%, the base station may enter a dormant state in the next state. If the electric quantity currently stored by the base station is higher than a switching threshold by 80%, the base station may enter a service state in the next state, where the switching threshold can be set. In the current state, pre-determining, by each base station, the next state of the base station may be shown in the following Table 1.

TABLE 1

| Base station number | Current state | Currently stored electric quantity | Pre-determined next state |
|---|---|---|---|
| 1 | Service state | 50% | Service state |
| 2 | Service state | 18% | Dormant state |
| 3 | Dormant state | 100% | Service state |
| 4 | Service state | 75% | Service state |
| 5 | Service state | 85% | Service state |
| 6 | Dormant state | 15% | Dormant state |

It can be learned from Table 1 that the transition of each base station from the current state to the next state may include the following several possible cases: continuing the service state, continuing the dormant state, switching from the service state to the dormant state, and switching from the dormant state to the service state. The state information exchanged between the base stations may be a state identifier Index shown in the following Table 2. A correspondence between the Index and the base station state is shown in the following Table 2.

TABLE 2

| State identifier Index | State |
|---|---|
| 0 | Continuing service state |
| 1 | Continuing dormant state |
| 2 | Switching from the service state to the dormant state |
| 3 | Switching from the dormant state to the service state |

At the moment in the state 1, each base station may send, to another base station, the state information indicating whether the base station is capable of providing the service in the next state. It can be learned from Table 1 and Table 2 that, the state information sent by each base station may be shown in Table 3.

TABLE 3

| Base station number | Current state | Currently stored electric quantity | Pre-determined next state | State information sent |
|---|---|---|---|---|
| 1 | Service state | 50% | Service state | 0 |
| 2 | Service state | 18% | Dormant state | 2 |
| 3 | Dormant state | 100% | Service state | 3 |
| 4 | Service state | 75% | Service state | 0 |
| 5 | Service state | 85% | Service state | 0 |
| 6 | Dormant state | 15% | Dormant state | 1 |

For example, the base station 1 separately sends, to the base station 2, the base station 3, the base station 4, the base station 5, and the base station 6, state information indicating whether the base station 1 is capable of providing a service in the next state; the base station 2 separately sends, to the base station 1, the base station 3, the base station 4, the base station 5, and the base station 6, state information indicating whether the base station 2 is capable of providing a service in the next state; and so on. For any one of the six base stations, the base station may receive the next state information sent by other base stations. For example, for the base station 1, the base station 1 may receive next state information separately sent by the base station 2, the base station 3, the base station 4, the base station 5, and the base station 6.

Herein, the next state information separately sent by the base station 2, the base station 3, the base station 4, the base station 5, and the base station 6 may be denoted as the first state information, and the next state information sent by the base station 1 may be denoted as second state information.

Step S302: The first network device determines, based on at least the first state information, a network topology obtained after the first network device and the at least one second network device in the next state are networked.

For example, after the base station 1 receives the first state information separately sent by the base station 2, the base station 3, the base station 4, the base station 5, and the base station 6, the base station 1 determines, based on at least the first state information, a network topology obtained after the six base stations in the next state are networked.

In a possible manner, the base station 1 may determine, based on the state information indicating whether the base station 1 is capable of providing the service in the next state, namely, the second state information, and the state information separately indicating whether the base station 2, the base station 3, the base station 4, the base station 5, and the base station 6 are capable of providing a service in the next state, namely, the first state information, a target base station that is in the six base stations and that provides a service in the next state.

As shown in Table 3, the base station 1 pre-determines that the base station 1 is in the service state in the next state. The base station 1 determines, based on the first state information separately sent by the base station 2, the base station 3, the base station 4, the base station 5, and the base station 6, that the base station 2 and the base station 6 are in the dormant state in the next state, and the base station 3, the base station 4, and the base station 5 are in the service state in the next state. Therefore, the base station 1 may determine that target base stations that are in the six base stations and that provide services in the next state are the base station 1, the base station 3, the base station 4, and the base station 5.

In another possible manner, after the base station 1 receives the first state information separately sent by the base station 2, the base station 3, the base station 4, the base station 5, and the base station 6, the base station 1 determines, based on a priority sequence, of providing a service by the six base stations in the next state, locally pre-stored by the base station 1 and a preset quantity of serving base stations, a target base station that is in the six base stations and that provides a service in the next state.

Figure 5:
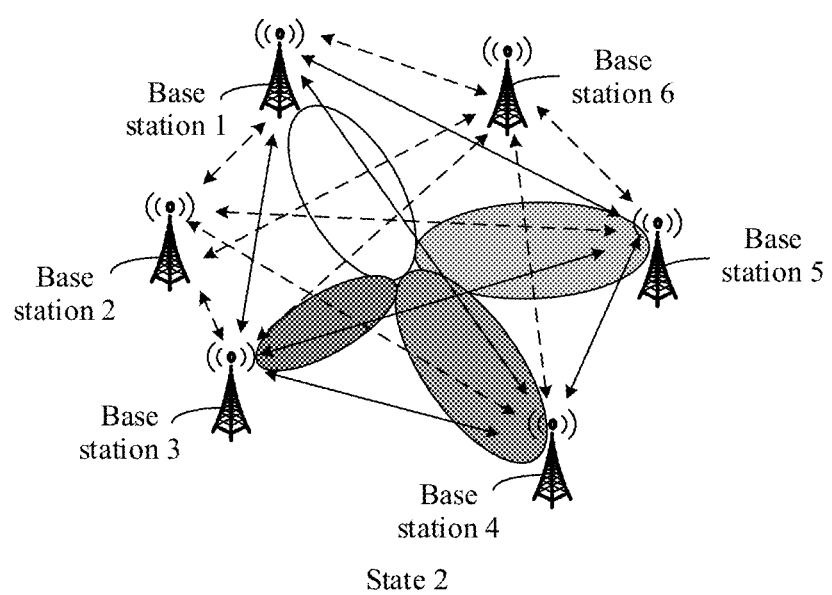
FIG. 5 is a schematic diagram of another application scenario according to an embodiment of this application.

For example, the priority sequence, of providing a service by the six base stations in the next state, locally pre-stored by the base station 1 is: the base station 1, the base station 3, the base station 4, the base station 5, the base station 6, and the base station 2. If the preset quantity of serving base stations is 4, the base station 1 may filter out that target base stations that provide services in the next state are the base station 1, the base station 3, the base station 4, and the base station 5. As shown in FIG. 5, in the next state, namely, a state 2, the base station 1, the base station 3, the base station 4, and the base station 5 provide services for the terminal.

It may be understood that, because the base stations in the six base stations exchange the next state information predicted in the current state, each base station may determine a target base station that provides a service in the next state. For example, each base station may determine, based on the next state information of the base station and next state information of another base station, the target base station that provides the service in the next state. Alternatively, each base station may determine, based on the locally stored priority sequence of providing a service by the six base stations in the next state and the preset quantity of serving base stations, the target base station that provides the service in the next state. Herein, a method for determining a target base station by the base station 2, the base station 3, the base station 4, the base station 5, and the base station 6 is the same as a method for determining the target base station by the base station 1. Therefore, the target base station determined by each base station is the same.

In a possible design, the base station 1 periodically sends the second state information, the base station 2, the base station 3, the base station 4, the base station 5, the base station 6 periodically send the first state information, and a sending cycle of the first state information is the same as a sending cycle of the second state information. For example, the base stations in the six base stations may exchange the next state information at a fixed moment and at a same frequency, for example, every 30 minutes, and determine the target base station that provides the service in the next state.

In addition, after determining the target base station that provides the service in the next state, each base station may further determine a serving base station newly added in the next state. The serving base station newly added is a base station that does not provide a service in the current state but provides a service in the next state. For example, by comparing FIG. 4 and FIG. 5, it can be learned that the base station 3 is the serving base station newly added in the next state. The base station 3 is a movable base station. Each base station may further determine location information of the base station 3 in the next state, and send the location information to the base station 3, so that the base station 3 moves to a location indicated by the location information and provides the service in the next state at the location.

In a possible manner, each base station determines the location information of the base station 3 in the next state based on location information of the base station 1, the base station 4, and the base station 5 in the next state, so that coverage of the base station 1, the base station 3, the base station 4, and the base station 5 that provide services in the next state meets a preset requirement, or a system capacity meets a preset requirement. The location information of the base station 1, the base station 4, and the base station 5 in the next state may be location information of the base station 1, the base station 4, and the base station 5 in the current state.

In another possible manner, each base station may store a combination mode of any four of the six base stations and location information of each base station in each combination mode, including a combination mode of the base station 1, the base station 3, the base station 4, and the base station 5, and location information of the base station 1, the base station 3, the base station 4, and the base station 5 in the combination mode. When each base station determines that the base stations that provide the services in the next state are the base station 1, the base station 3, the base station 4, and the base station 5, the location information of each base station in the pre-stored combination mode may be further queried based on the combination mode of the base station 1, the base station 3, the base station 4, and the base station 5. In addition, the location information of each base station in the combination mode is sent to a corresponding base station, so that the base stations that provide the services in the next state adjust their locations, and a network topology obtained after the six base stations are networked can change with time.

In this embodiment, after the first network device and the at least one second network device are networked, the first network device and the at least one second network device predict, in the current state, whether the first network device and the at least one second network device are capable of providing services in the next state. The first network device receives, from the at least one second network device, the first state information used to indicate whether the second network device is capable of providing the service in the next state; and determines, based on at least the first state information, the network topology obtained after the first network device and the at least one second network device in the next state are networked, so that the network topology can change with time, thereby improving flexibility of the network topology, and reducing manual maintenance costs caused by manual adjustment of the location of the base station.

In the foregoing embodiment, the base stations that are networked exchange the next state information, so that each base station may determine the target base station that provides the service in the next state. In this embodiment, one of the base stations that are networked may determine the target base station that provides the service in the next state, and not every base station needs to determine the target base station that provides the service in the next state.

Figure 6:
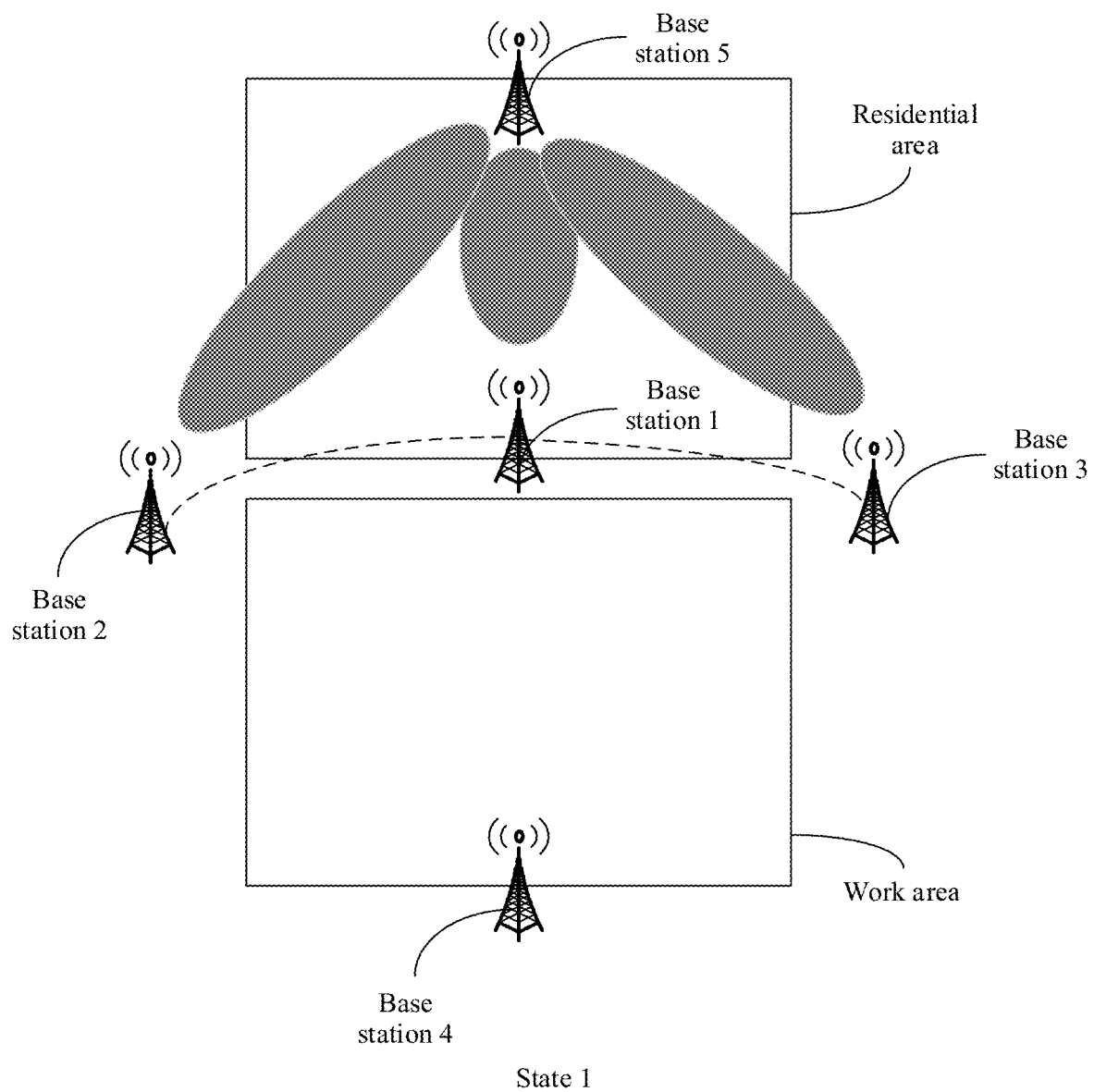
FIG. 6 is a schematic diagram of another application scenario according to an embodiment of this application.

FIG. 6 is a schematic diagram of another application scenario according to an embodiment of this application. As shown in FIG. 6, a base station 1, a base station 2, a base station 3, a base station 4, and a base station 5 are networked together to provide services for a terminal. The base station 2, the base station 3, the base station 4, and the base station 5 respectively send next state information of the base station 2, the base station 3, the base station 4, and the base station 5 to the base station 1, and the base station 1 determines a target base station that provides a service in a next state. The base station 1 is specifically the first network device in the foregoing embodiment, and the base station 2, the base station 3, the base station 4, and the base station 5 are specifically the second network devices in the foregoing embodiment.

In a current state, namely, a state 1 shown in FIG. 6, the base station 2, the base station 3, and the base station 5 provide services for terminals in a residential area, and the base station 4 is in a dormant state. It is assumed that the current state is morning peak hours, during which a large quantity of terminal users move from the residential area to a work area. Online user state information of the base station 2, the base station 3, and the base station 5 is constantly changing, and the online user state information may be specifically a quantity of online users. The quantity of online users in current coverage of the base station 2, the base station 3, and the base station 5 is decreasing. Because the base station 4 is in the dormant state in the current state, a quantity of online users in the current coverage of the base station 4 is 0.

Figure 7:
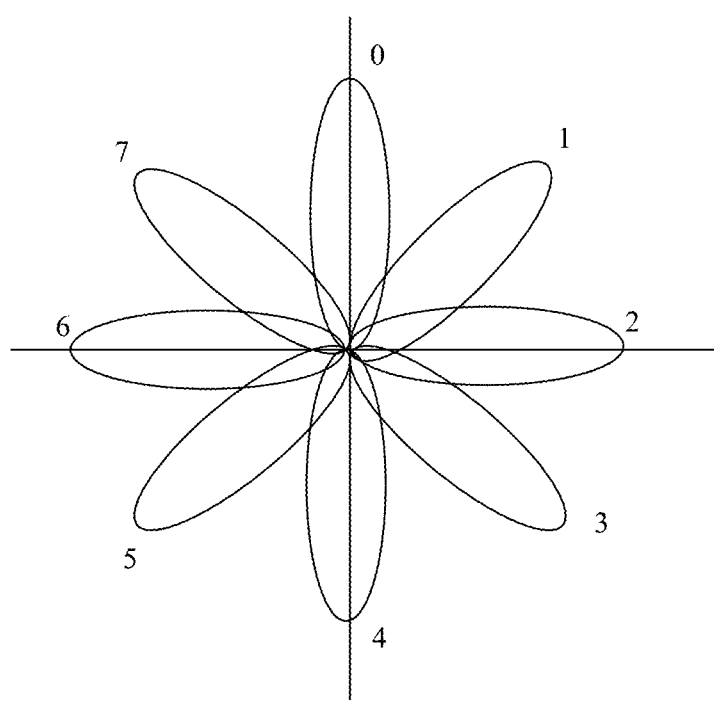
FIG. 7 is a schematic diagram of a plurality of beamforming weight directions according to this application.

In this embodiment, the base station 2, the base station 3, the base station 4, and the base station 5 may determine, based on the quantity of online users in the current coverage, whether the base station 2, the base station 3, the base station 4, and the base station 5 are capable of providing a service in the next state. Next state information predicted by the base station 2, the base station 3, the base station 4, and the base station 5 in the current state is the first state information in the foregoing embodiment. Herein, the current state information of the base station 2, the base station 3, the base station 4, and the base station 5 is denoted as third state information. The third state information includes at least one of the following: an electric quantity, online user state information, load information, a signal-to-noise ratio, a throughput, and user state information corresponding to at least a portion of a plurality of beamforming weight directions. The plurality of beamforming weight directions may be specifically eight directions shown in FIG. 7, and identifiers of the eight directions are 0 to 7. In other words, each base station may correspondingly have the eight beamforming weight directions shown in FIG. 7. User state information in different beamforming weight directions of a same base station may be different. The user state information may be specifically a quantity of users. For example, in the state 1 shown in FIG. 6, the current coverage of the base station 2 is coverage of a beamforming weight direction 1, a quantity of online users in the beamforming weight direction 1 is decreasing, and a quantity of potential users in a beamforming weight direction 3 is increasing.

In this embodiment, the base station 2, the base station 3, the base station 4, and the base station 5 may separately send the first state information and the third state information to the base station 1, and the base station 1 may determine, based on the first state information and the third state information that are separately sent by the base station 2, the base station 3, the base station 4, and the base station 5, a network topology obtained after the base station 1, the base station 2, the base station 3, the base station 4, and the base station 5 in the next state are networked. A sequence in which the base station 2, the base station 3, the base station 4, or the base station 5 sends the first state information and the third state information is not limited in this embodiment. For example, the base station 2 is used as an example. The base station 2 may first send the first state information to the base station 1, and then send the third state information to the base station 1. Alternatively, the base station 2 may first send the third state information to the base station 1, and then send the first state information to the base station 1. Alternatively, the base station 2 may simultaneously send the first state information and the third state information to the base station 1.

In a possible manner, the base station 2, the base station 3, the base station 4, and the base station 5 detect, in the current state, the user state information corresponding to the at least a portion of the plurality of beamforming weight directions. For example, the base station 2, the base station 3, the base station 4, and the base station 5 may detect, in the state 1 shown in FIG. 6, quantities of users corresponding to the eight beamforming weight directions of the base station 2, the base station 3, the base station 4, and the base station 5 respectively. Alternatively, the base station 2, the base station 3, the base station 4, and the base station 5 may detect, in the state 1 shown in FIG. 6, quantities of users corresponding to some of the eight beamforming weight directions of the base station 2, the base station 3, the base station 4, and the base station 5 respectively. The some of the eight beamforming weight directions are not specifically limited in this embodiment. For example, the base station 2 detects, in the state 1, quantities of users corresponding to beamforming weight directions 0 to 4; the base station 3 detects, in the state 1, quantities of users corresponding to beamforming weight directions 4 to 7; the base station 4 detects, in the state 1, quantities of users corresponding to beamforming weight directions 0, 1, and 7; and the base station 5 detects, in the state 1, quantities of users corresponding to beamforming weight directions 3 to 5.

In another possible manner, when the base station 2, the base station 3, the base station 4, or the base station 5 determines that the quantity of online users in the current coverage is less than a threshold, for example, 300, the base station 2, the base station 3, the base station 4, or the base station 5 detects a quantity of users corresponding to each of the eight beamforming weight directions, or detects quantities of users corresponding to some of the eight beamforming weight directions.

In still another possible manner, after determining the quantity of online users in the current coverage, the base station 2, the base station 3, the base station 4, and the base station 5 send the quantity of online users of the base station 2, the base station 3, the base station 4, and the base station 5 in the current coverage respectively to the base station 1. The base station 1 determines which base stations in the base station 2, the base station 3, the base station 4, and the base station 5 have a quantity of online users less than a threshold, for example, 300. For example, if the base station 1 determines that a quantity of online users of the base station 5 is less than 300, the base station 1 sends a beam sweeping probe instruction to the base station 5, where the beam sweeping probe instruction is used to indicate the base station 5 to detect a quantity of users corresponding to each of the eight beamforming weighting directions, or to detect quantities of users corresponding to some of the eight beamforming weight directions.

In yet another possible manner, the base station 1 periodically sends a beam sweeping probe instruction to the base station 2, the base station 3, the base station 4, and the base station 5, so that the base station 2, the base station 3, the base station 4, and the base station 5 periodically detect a quantity of users corresponding to each of the eight beamforming weight directions, or detect quantities of users corresponding to some of the eight beamforming weight directions.

A possible manner in which the base station 2, the base station 3, the base station 4, and the base station 5 respectively send the third state information to the base station 1 is: The base station 1 separately sends configuration information to the base station 2, the base station 3, the base station 4, and the base station 5. The configuration information is used to indicate the base station 2, the base station 3, the base station 4, and the base station 5 to send the third state information to the base station 1. For example, the configuration information may indicate the base station 2, the base station 3, the base station 4, and the base station 5 to periodically send the third state information to the base station 1.

In a possible manner, the configuration information is used to indicate a same base station of the base station 2, the base station 3, the base station 4, and the base station 5 to send different third state information to the base station 1. For example, the configuration information may indicate the base station 2, in the current state, to send an electric quantity and online user state information that are of the base station 2 to the base station 1; and indicate the base station 2, in the next state, to send a signal-to-noise ratio, a throughput, and user state information corresponding to at least a portion of a plurality of beamforming weight directions that are of the base station 2 to the base station 1.

In another possible manner, the configuration information is used to indicate different base stations in the base station 2, the base station 3, the base station 4, and the base station 5 to send different third state information to the base station 1. For example, the configuration information sent by the base station 1 to the base station 2 is used to indicate the base station 2 to send an electric quantity and online user state information that are of the base station 2 to the base station 1. The configuration information sent by the base station 1 to the base station 3 is used to indicate the base station 3 to send a signal-to-noise ratio and a throughput that are of the base station 3 to the base station 1. The configuration information sent by the base station 1 to the base station 4 is used to indicate the base station 4 to send, to the base station 1, user state information corresponding to at least a portion of a plurality of beamforming weight directions of the base station 4.

For example, in the state 1 shown in FIG. 6, the third state information separately reported by the base station 2, the base station 3, the base station 4, and the base station 5 to the base station 1 includes the user state information corresponding to the at least a portion of the plurality of beamforming weight directions. The base station 1 may determine, based on the user state information corresponding to the at least a portion of the plurality of beamforming weight directions that is reported by the base station 2, the base station 3, the base station 4, and the base station 5 and the next state information predicted by the base station 2, the base station 3, the base station 4, and the base station 5, the network topology obtained after the base station 1, the base station 2, the base station 3, the base station 4, and the base station 5 in the next state are networked.

In a possible manner, the base station 1 determines, based on the user state information corresponding to the at least a portion of the plurality of beamforming weight directions that is reported by the base station 2, the base station 3, the base station 4, and the base station 5 and the next state information predicted by the base station 2, the base station 3, the base station 4, and the base station 5, the target base station that is in the base station 1, the base station 2, the base station 3, the base station 4, and the base station 5 and that provides the service in the next state.

For example, the base station 2 and the base station 3 are in a service state in the state 1 shown in FIG. 6, and the base station 2 and the base station 3 predict to be in the service state in the next state. The base station 4 is in the dormant state in the state 1 shown in FIG. 6, and the base station 4 predicts to be in the service state in the next state. The base station 5 is in the service state in the state 1 shown in FIG. 6, and the base station 5 predicts to be the dormant state in the next state. Results obtained after the base station 2, the base station 3, the base station 4, and the base station 5 scan the eight beamforming weight directions of the base station 2, the base station 3, the base station 4, and the base station 5 respectively in the state 1 are specifically shown in Table 4.

of the eight beamforming weight directions and that is sent by the base station 4 to the base station 1 may be 10000000. User state information that corresponds to each of the eight beamforming weight directions and that is sent by the base station 5 to the base station 1 may be 00000000.

The base station 1 may determine, based on the user state information that corresponds to each of the eight beamforming weight directions and that is separately sent by the base station 2, the base station 3, the base station 4, and the base station 5 and the next state information separately predicted by the base station 2, the base station 3, the base station 4, and the base station 5, that target base stations that provide services in the next state are the base station 2, the base station 3, and the base station 4. At a moment in the state 1, the base station 1 separately sends information shown in the following Table 5 to the base station 2, the base station 3, the base station 4, and the base station 5.

TABLE 5

| Base station number | State identifier Index |
|---|---|
| 2 | 0 |
| 3 | 0 |
| 4 | 3 |
| 5 | 2 |

The state identifier Index in Table 5 is consistent with the state identifier Index in Table 2 in terms of a state of a base station. Details are not described herein again. In the next state, namely, a state 2 shown in FIG. 8, the base station 2, the base station 3, and the base station 4 provide services for the terminals in the work area, and the base station 5 is in the dormant state.

In another possible manner, after determining the target base stations that are in the base station 1, the base station 2, the base station 3, the base station 4, and the base station 5 and that provide the services in the next state, the base station 1 may further determine, based on user state information corresponding to at least a portion of a plurality of beamforming weight directions that is reported by the target base stations, at least one of beamforming weight directions, waveform information, and location information that are of the target base stations in the next state.

TABLE 4

| Base station number | Quantity of users corresponding to a beamforming weight direction 0 | Quantity of users corresponding to a beamforming weight direction 1 | Quantity of users corresponding to a beamforming weight direction 2 | Quantity of users corresponding to a beamforming weight direction 3 | Quantity of users corresponding to a beamforming weight direction 4 | Quantity of users corresponding to a beamforming weight direction 5 | Quantity of users corresponding to a beamforming weight direction 6 | Quantity of users corresponding to a beamforming weight direction 7 |
|---|---|---|---|---|---|---|---|---|
| 2 | <300 | <300 | <300 | >300 | <300 | <300 | <300 | <300 |
| 3 | <300 | <300 | <300 | <300 | <300 | >300 | <300 | <300 |
| 4 | >300 | <300 | <300 | <300 | <300 | <300 | <300 | <300 |
| 5 | <300 | <300 | <300 | <300 | <300 | <300 | <300 | <300 |

In a possible manner, 1 is used to indicate that a quantity of users is greater than 300, and 0 is used to indicate that the quantity of users is less than 300. User state information that corresponds to each of the eight beamforming weight directions and that is sent by the base station 2 to the base station 1 may be 00010000. User state information that corresponds to each of the eight beamforming weight directions and that is sent by the base station 3 to the base station 1 may be 00000100. User state information that corresponds to each For example, after determining that the target base stations that provide the services in the next state are the base station 2, the base station 3, and the base station 4, the base station 1 further determines, based on user state information corresponding to each of the eight beamforming weight directions that is reported by the base station 2, the base station 3, and the base station 4, beamforming weight directions of the base station 2, the base station 3, and the base station 4 in the next state. For example, in the state 1, the quantity of potential users in the beamforming weight direction 3 of the base station 2 is greater than 300, a quantity of potential users in a beamforming weight direction 5 of the base station 3 is greater than 300, and the quantity of potential users in the beamforming weight direction 0 of the base station 4 is greater than 300. In this case, the base station 1 may determine the beamforming weight direction 3 as the beamforming weight direction of the base station 2 in the next state, determine the beamforming weight direction 5 as the beamforming weight direction of the base station 3 in the next state, and determine the beamforming weight direction 0 as the beamforming weight direction of the base station 4 in the next state.

At the moment in the state 1, the base station 1 separately sends information shown in the following Table 6 to the base station 2, the base station 3, the base station 4, and the base station 5.

TABLE 6

| Base station number | State identifier Index | Beamforming weight direction Index |
|---|---|---|
| 2 | 0 | 3 |
| 3 | 0 | 5 |
| 4 | 3 | 0 |
| 5 | 2 | — |

After receiving the information separately sent by the base station 1, the base station 2, the base station 3, the base station 4, and the base station 5 determine whether a received state identifier Index indicates that the next state is a service state, and if the received state identifier Index indicates that the next state is the service state, a beam direction is adjusted based on a corresponding beamforming weight direction Index. If the received state identifier Index indicates that the next state is a dormant state, no service is performed in the next state. For example, if a state identifier Index received by the base station 2 indicates that the next state is a service state, and a beamforming weight direction Index received by the base station 2 is 3, the base station 2 adjusts the beamforming weight direction 1 of the base station 2 in the state 1 to the beamforming weight direction 3 shown in the state 2, so that the base station 2 provides a service for the terminals in the work area in the state 2 based on the beamforming weight direction 3.

In addition, the base station 1 may further determine the waveform information of the target base stations in the next state, for example, beam width, based on terminal distribution information in the beamforming weight directions of the target base stations in the next state, and send the waveform information to the target base stations, so that the target base stations adjust a waveform of the target base stations in the next state.

In addition, the base station 2, the base station 3, the base station 4, and the base station 5 may be mobile base stations, and the base station 1 may further determine the location information of the target base stations in the next state. A specific method is the same as the method in the foregoing embodiment, and details are not described herein again. Further, the base station 1 sends the location information of the target base stations in the next state to the target base stations, so that the target base stations adjust locations of the target base stations in the next state.

In some embodiments, the base station 1 is also a mobile base station, and the base station 1 may further determine, based on a plurality of preset locations, a target location of the base station 1 in the next state from the plurality of locations.

It may be understood that when at least one of the target base stations that provide the services, the beamforming weight directions, the waveform information, and the location information that are of the target base stations changes, the network topology obtained after the base station 1, the base station 2, the base station 3, the base station 4, and the base station 5 are networked may change.

In this embodiment, the base station 1 may periodically determine the network topology obtained after the base station 1, the base station 2, the base station 3, the base station 4, and the base station 5 are networked. In each cycle, a method for determining the network topology by the base station 1 is the same as the foregoing method, and details are not described herein again.

Figure 8:
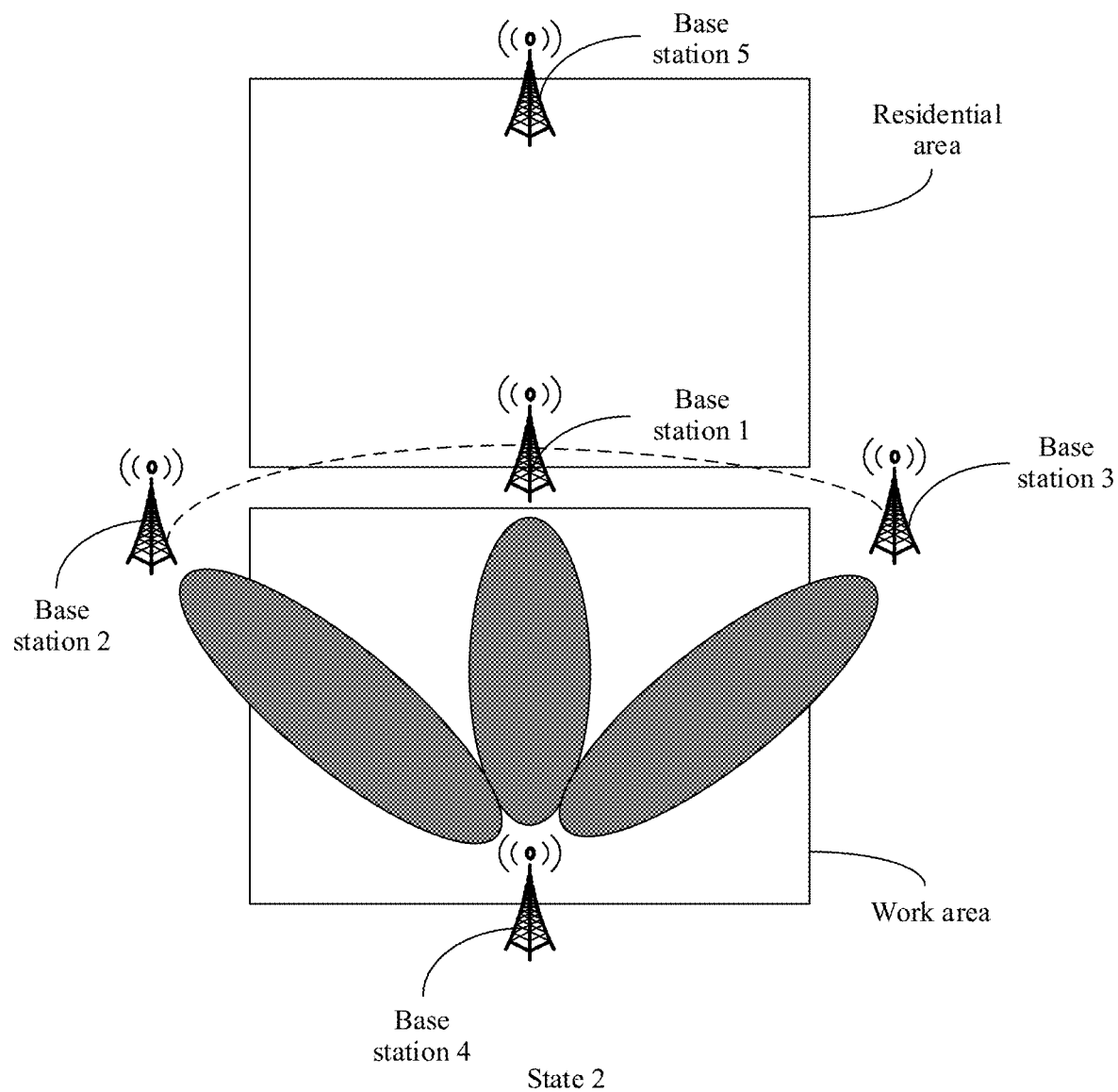
FIG. 8 is a schematic diagram of still another application scenario according to an embodiment of this application.

For example, the state 2 shown in FIG. 8 is a work time. The base station 2, the base station 3, and the base station 4 provide the services for the terminals in the work area, and the base station 2, the base station 3, the base station 4, and the base station 5 periodically report the third state information and the first state information to the base station 1, so that the base station 1 can periodically determine the network topology in the next state. During off-duty peak hours, quantities of potential users corresponding to beamforming weight directions 3 to 5 of the base station 5 keep increasing, the quantity of online users in the current coverage of the base station 4 keeps decreasing, a quantity of potential users corresponding to the beamforming weight direction 1 of the base station 2 keeps increasing, and a quantity of potential users corresponding to a beamforming weight direction 7 of the base station 3 keeps increasing. In this case, the base station 1 may determine that the target base stations that provide the services in the next state are the base station 2, the base station 3, and the base station 5. In addition, the beamforming weight direction of the base station 2 is adjusted from the beamforming weight direction 3 to the beamforming weight direction 1, and the beamforming weight direction of the base station 3 is adjusted from the beamforming weight direction 5 to the beamforming weight direction 7, so that the base station 2, the base station 3, and the base station 5 provide the services for the terminals in the residential area during hours of living, as shown in FIG. 6.

In this embodiment, the first network device receives the first state information and the third state information that are reported by the at least one second network device, where the first state information is used to indicate the next state information predicted by the second network device, and the third state information is used to indicate the current state of the second network device. In this way, the first network device may determine the network topology in the next state based on the first state information and the third state information, so that the network topology may change with time, thereby improving flexibility of the network topology. In addition, the first network device and the at least one second network device do not need to exchange information with each other. When a quantity of network devices that are networked is relatively large, network congestion caused by a large quantity of information sending and receiving can be effectively avoided.

In the embodiments described in FIG. 4 and FIG. 5, the base stations that are networked exchange the next state information. When a quantity of base stations that are networked is relatively large, each base station in the networking sends and receives a large amount of information.

In this embodiment, the base stations that are networked may be grouped, to reduce an amount of information sent and received by each base station.

Figure 9:
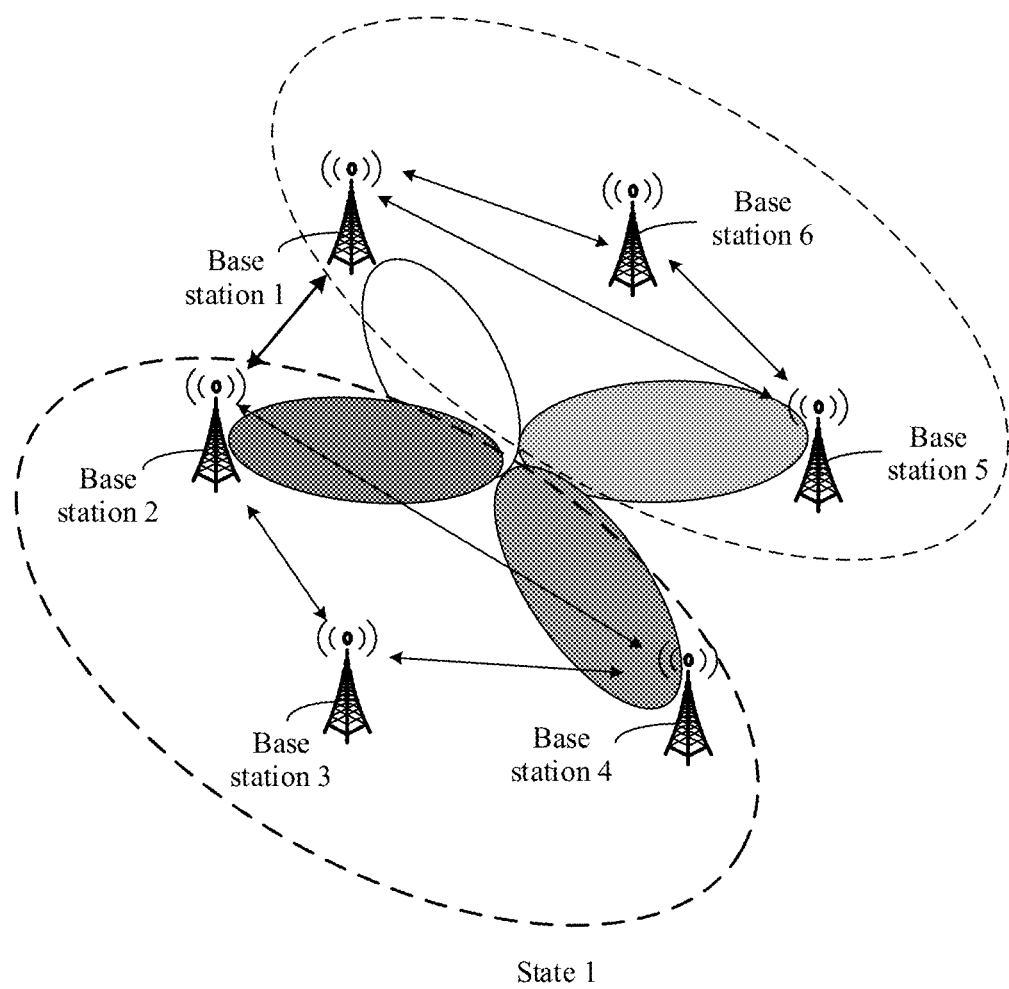
FIG. 9 is a schematic diagram of still another application scenario according to an embodiment of this application.

In a possible manner, base stations are grouped based on factors such as a geographical location, a priority, a micro base station type, and a coverage area of the base station. As shown in FIG. 9, six base stations are grouped into two groups. A base station 1, a base station 6, and a base station 5 form one group, and a base station 2, a base station 3, and a base station 4 form the other group. For example, the group to which the base station 1, the base station 6, and the base station 5 belong is denoted as a first group, and the group in which the base station 2, the base station 3, and the base station 4 are located is denoted as a second group. This embodiment is not limited to dividing a plurality of base stations in the networking into two groups, but the base stations may further be divided into more groups, and a quantity of base stations included in each group may be different. Base stations in a same group may communicate with each other. For example, the base station 1, the base station 6, and the base station 5 in the first group may communicate with each other. Information exchanged during the communication between the base stations is not limited to the next state information pre-determined by each base station in the current state, for example, the first state information in the foregoing embodiment, but may alternatively be the current state information of each base station, for example, the third state information in the foregoing embodiment. Similarly, the base station 2, the base station 3, and the base station 4 in the second group may communicate with each other. In addition, base stations in different groups may also communicate with each other. For example, at least one base station in each group may communicate with a base station in another group. For example, the base station 1 in the first group may send first state information and/or third state information that are/is of each base station in the first group to the base station 2 in the second group. The base station 2 in the second group may also send first state information and/or third state information that are/is of each base station in the second group to the base station 1 in the first group.

As shown in FIG. 9, at a moment in a state 1, base stations that provide services in the first group are the base station 1 and the base station 5, and the base station 1, the base station 6, and the base station 5 determine, based on at least one of a current electric quantity, online user state information, load information, a signal-to-noise ratio, and a throughput that are of the base station 1, the base station 6, and the base station 5, whether the base station 1, the base station 6, and the base station 5 are capable of providing services in a next state; and send state information indicating whether the base station 1, the base station 6, and the base station 5 are capable of providing the services in the next state to another base station. Each of the base station 1, the base station 6, and the base station 5 determines, from the three base stations based on a pre-stored priority sequence of providing a service in the next state and a preset quantity of serving base stations, a target base station that provides a service in the next state. For example, in the first group, the priority sequence of providing a service in the next state is the base station 1, the base station 6, and the base station 5, and the preset quantity of serving base stations is 2. In this case, target base stations that provide services in the next state are the base station 1 and the base station 6.

Similarly, at the moment in the state 1, base stations that provide services in the second group are the base station 2 and the base station 4, and the base station 2, the base station 3, and the base station 4 determine, based on at least one of a current electric quantity, online user state information, load information, a signal-to-noise ratio, and a throughput that are of the base station 2, the base station 3, and the base station 4, whether the base station 2, the base station 3, and the base station 4 are capable of providing services in the next state; and send state information indicating whether the base station 2, the base station 3, and the base station 4 are capable of providing the services in the next state to another base station. Each of the base station 2, the base station 3, and the base station 4 determines, from the three base stations based on a pre-stored priority sequence of providing a service in the next state and a preset quantity of serving base stations, a target base station that provides a service in the next state. For example, in the second group, the priority sequence of providing a service in the next state is the base station 4, the base station 3, and the base station 2, and the preset quantity of serving base stations is 2. In this case, target base stations that provide services in the next state are the base station 4 and the base station 3.

Figure 10:
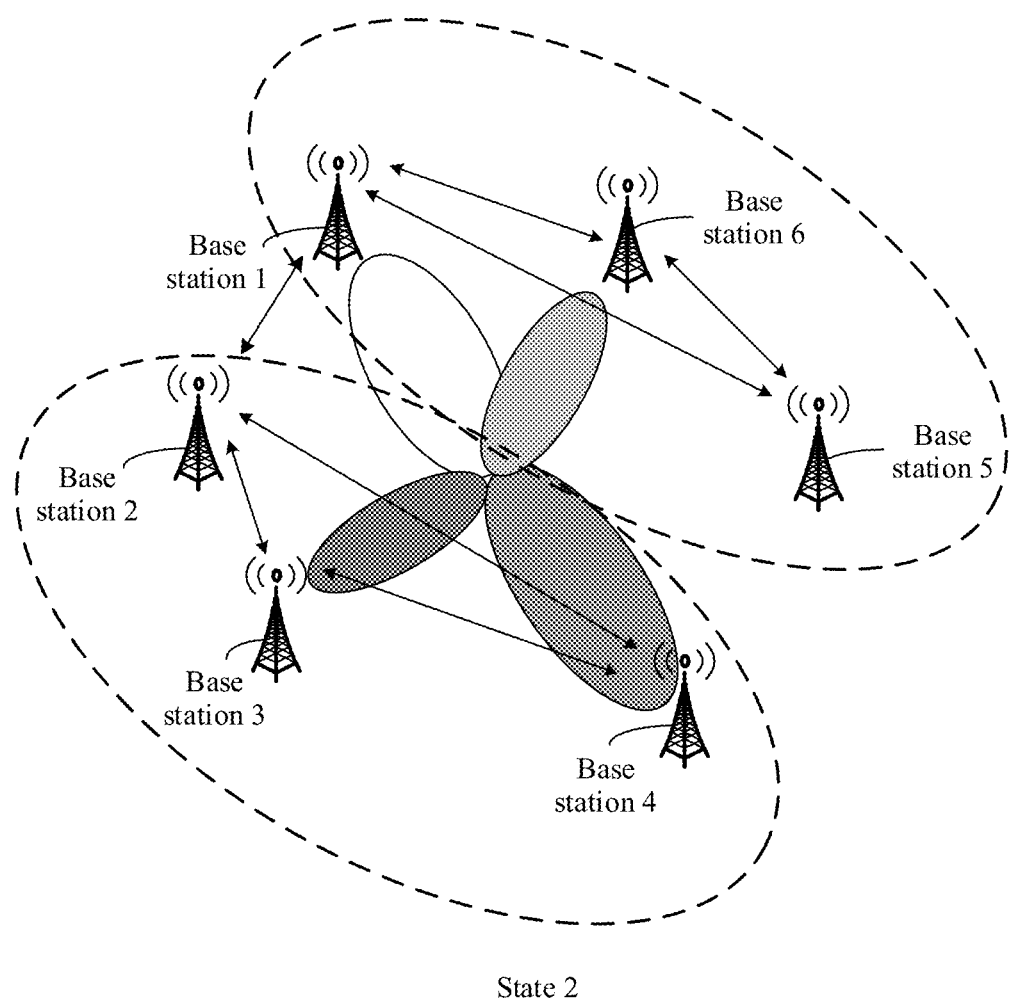
FIG. 10 is a schematic diagram of yet another application scenario according to an embodiment of this application.

It may be understood that, in different groups, a quantity of target base stations that provide services in the next state may be different. As shown in FIG. 10, target base stations that provide services in the next state are the base station 1, the base station 6, the base station 4, and the base station 3.

In addition, after determining the target base stations that provide the services in the next state, location information of a serving base station newly added in the next state may be further determined. For example, in the state 1 shown in FIG. 9, the base station 1, the base station 5, the base station 4, and the base station 2 provide services. In a state 2 shown in FIG. 10, the base station 1, the base station 6, the base station 4, and the base station 3 provide the services. The base station 3 and the base station 6 are serving base stations newly added in the next state. Herein, a method for determining location information of the serving base stations newly added in the next state is the same as the method in the foregoing embodiment, and details are not described herein again.

Figure 11:
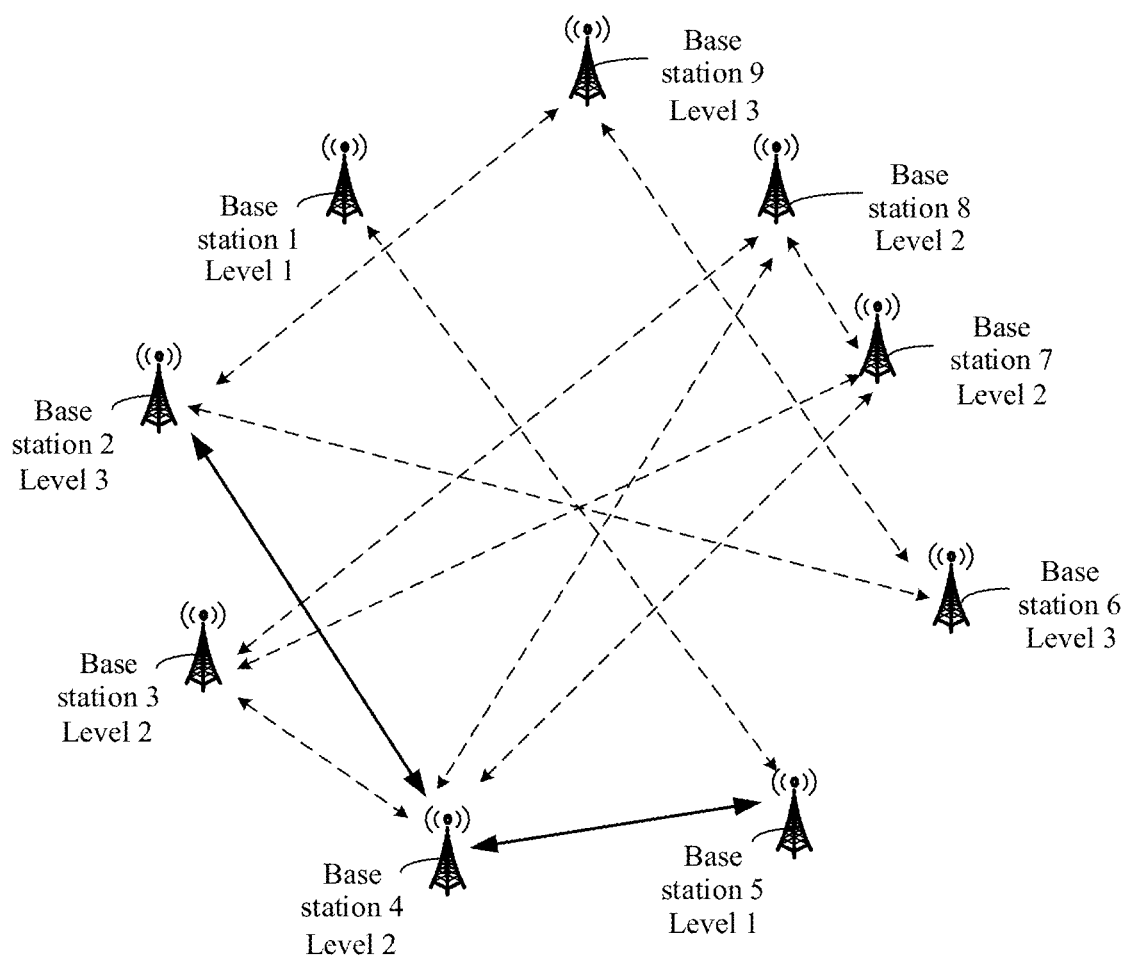
FIG. 11 is a schematic diagram of yet another application scenario according to an embodiment of this application.

In another possible manner, a plurality of base stations in the networking are grouped based on levels of the base stations, and base stations of a same level are grouped into a same group. A level of a base station may be determined based on a quantity of antennas of the base station, user state information in a service area, and the like. For example, a larger quantity of antennas of a base station and a larger quantity of users in the service area indicate a higher level of the base station. As shown in FIG. 11, nine base stations are networked together, and the nine base stations include base stations at three levels. For example, a base station 1 and a base station 5 are base stations at a level 1; a base station 3, a base station 4, a base station 7, and a base station 8 are base stations at a level 2; and a base station 2, a base station 6, and a base station 9 are base stations at a level 3. The level 1 is higher than the level 2, and the level 2 is higher than the level 3. A quantity of base stations at different levels may be different. For example, the base station 1 and the base station 5 at the level 1 are grouped into a first group; the base station 3, the base station 4, the base station 7, and the base station 8 at the level 2 are grouped into a second group; and the base station 2, the base station 6, and the base station 9 at the level 3 are grouped into a third group. Base stations in a same group may communicate with each other. Information exchanged is described above, and details are not described herein again. There is at least one communication link between different groups. Because levels of base stations in each group are the same, levels of base stations communicating with each other in different groups are different. In a possible manner, base stations at different levels cannot perform cross-level communication. For example, a base station at the level 1 can communicate only with a base station at the level 2; the base station at the level 2 may communicate with the base station at the level 1, or may communicate with a base station at a level 3; and the base station at the level 3 can communicate only with the base station at the level 2.

As shown in FIG. 11, base stations in a same group may communicate with each other, to determine a target base station that provides a service in the group in a next state. When a base station in the same group enters a dormant state, base stations at a same level are preferably selected as supplementary base stations. If there are not enough base stations at the same level, base stations at a higher level are selected as the supplementary base stations.

Figure 12:
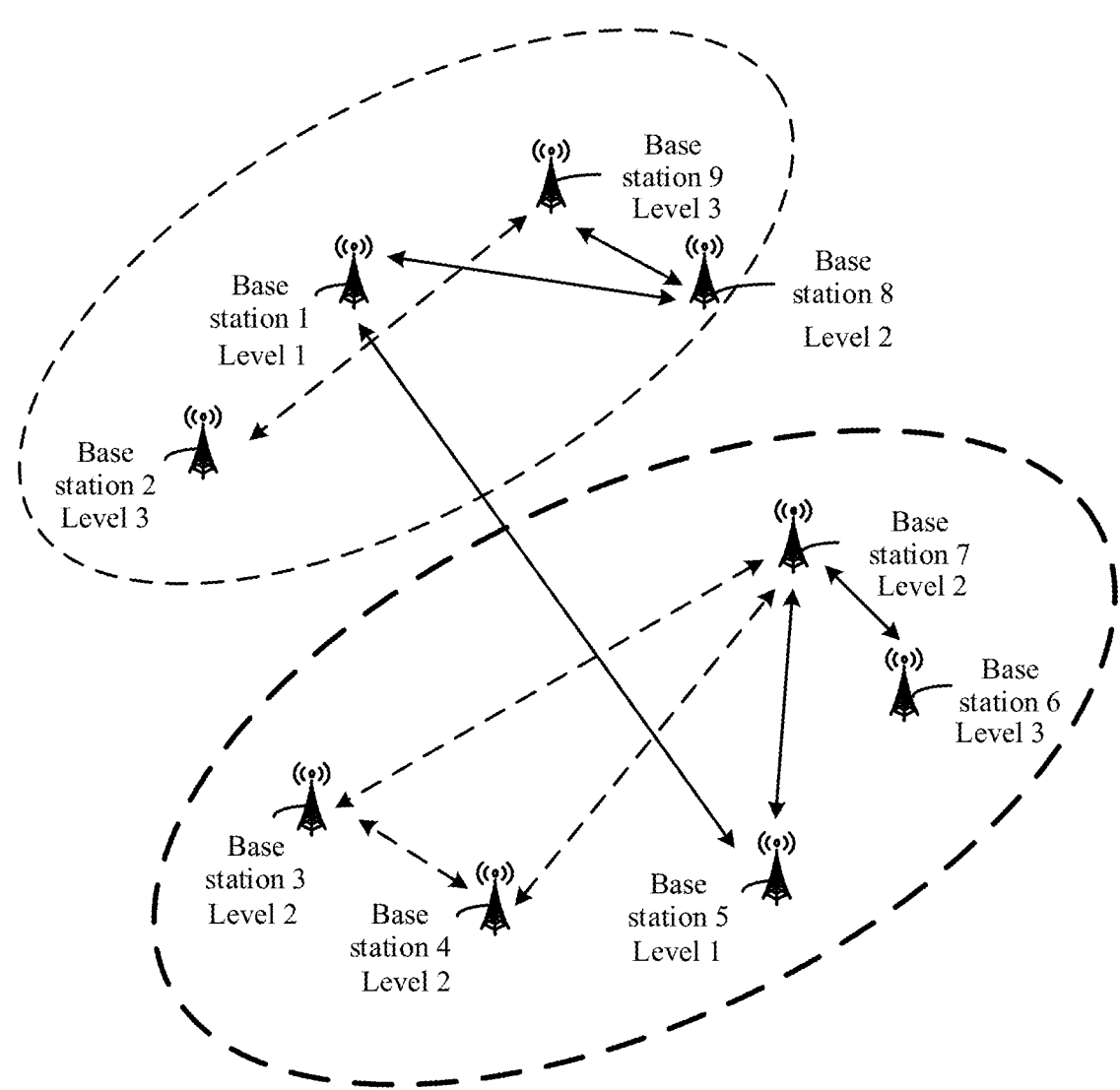
FIG. 12 is a schematic diagram of yet another application scenario according to an embodiment of this application.

In still another possible manner, a plurality of base stations in the networking are grouped based on levels of the base stations, and base stations at different levels are grouped into a same group. A quantity of base stations included in different groups may be different, and quantities of base stations at different levels in a same group may be different. As shown in FIG. 12, a base station 1, a base station 2, a base station 8, and a base station 9 are grouped into a first group, and a base station 3, a base station 4, a base station 5, a base station 6, and a base station 7 are grouped into a second group. The first group includes base stations at different levels. For example, the first group includes the base station 1 at a level 1, the base station 8 at a level 2, and the base station 2 and the base station 9 that are at a level 3. The second group also includes base stations at different levels. For example, the second group includes the base station 5 at the level 1, the base station 3, the base station 4, and the base station 7 that are at the level 2, and the base station 6 at the level 3. Base stations at a same level in a same group may communicate with each other. Information exchanged is described above, and details are not described herein again. In other words, the base stations at the same level in the same group may be further divided into small groups. For example, in the first group, the base stations 2 and the base station 9 may be grouped into one small group, the base station 8 may be one small group, and the base station 1 may be one small group. Base stations in each small group may communicate with each other. There is at least one communication link between small groups in a same group. In a possible manner, small groups at different levels in a same group cannot perform cross-level communication. For example, in the first group, the base station at the level 1 can communicate only with the base station at the level 2; the base station at the level 2 may communicate with the base station at the level 1, or may communicate with a base station at a level 3; and the base station at the level 3 can communicate only with the base station at the level 2.

In addition, there is at least one communication link between different groups. For example, the base station 1 at a highest level in the first group communicates with the base station 5 at a highest level in the second group. In addition, each group may further select a base station at a highest level in the group to communicate with a macro base station. For example, the base station 1 at the highest level in the first group and the base station 5 at the highest level in the second group may separately communicate with the macro base station.

In addition, as shown in FIG. 12, base stations at a same level in a same group may communicate with each other, to determine a target base station that provides a service in the group in a next state. When a base station in the same group enters a dormant state, base stations at a same level are preferably selected as supplementary base stations. If there are not enough base stations at the same level, base stations at a higher level are selected as the supplementary base stations.

In some embodiments, cycles of information exchange between base stations at different levels are different. In a possible manner, a cycle of information exchange between base stations at a high level is greater than a cycle of information exchange between base stations at a low level. As shown in FIG. 12, a cycle of information exchange between the base station 1 and the base station 5 that are at the level 1 is greater than a cycle of information exchange between the base station 3, the base station 4, and the base station 7 that are at the level 2.

In some other embodiments, cycles of information exchange between base stations at a same level in different groups are different. For example, the first group includes a base station A and a base station B that are at a level 2, and the second group includes a base station C and a base station D that are at a level 2. A cycle of information exchange between the base station A and the base station B is different from a cycle of information exchange between the base station C and the base station D.

In some other embodiments, a cycle of information exchange between different base stations may be preconfigured. For example, a cycle of information exchange between base stations at a low level may be configured by a base station at a high level, or a cycle of information exchange between different base stations is configured by a macro base station.

In this embodiment, the plurality of base stations in the networking are grouped, base stations in a group may communicate with each other, and there is at least one communication link between different groups. When a quantity of base stations that are networked is relatively large, communication overheads can be reduced, and a data amount of information processed by each base station can be reduced, thereby making information collection more timely.

It may be understood that some or all of the steps or operations in the foregoing embodiments are merely examples. In this embodiment of this application, other operations or variations of various operations may be further performed. In addition, the steps may be performed in a sequence different from that presented in the foregoing embodiments, and not all the operations in the foregoing embodiments are necessarily performed.

It may be understood that, in the foregoing embodiments, operations or steps implemented by the network device (for example, the first network device, the second network device, or a third network device) may alternatively be implemented by a component (for example, a chip or a circuit) that may be used in the network device.

Figure 13:
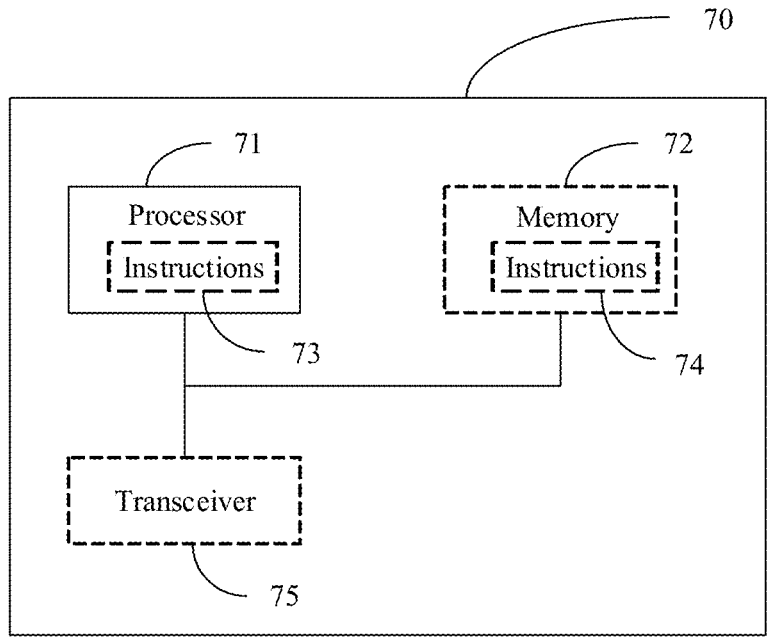
FIG. 13 is a schematic structural diagram of a communication apparatus according to an embodiment of this application.

FIG. 13 is a schematic structural diagram of a communication apparatus. The communication apparatus may be configured to implement the method corresponding to the network device (for example, the first network device, the second network device, or a third network device) described in the foregoing method embodiment. For details, refer to the descriptions in the foregoing method embodiment.

The communication apparatus 70 may include one or more processors 71. The processor 71 may also be referred to as a processing unit, and may implement a control function. The processor 71 may be a general-purpose processor, a dedicated processor, or the like.

In an optional design, the processor 71 may also store instructions 73, and the instructions may be run by the processor, so that the communication apparatus 70 performs the method corresponding to the terminal, the network device, or a core network node described in the foregoing method embodiment.

In another possible design, the communication apparatus 70 may include a circuit. The circuit may implement the sending, receiving, or communication function in the foregoing method embodiment.

Optionally, the communication apparatus 70 may include one or more memories 72. The memory stores instructions 74 or intermediate data. The instructions 74 may be run on the processor, so that the communication apparatus 70 performs the method described in the foregoing method embodiment. Optionally, the memory may further store other related data. Optionally, the processor may also store instructions and/or data. The processor and the memory may be separately disposed, or may be integrated together.

Optionally, the communication apparatus 70 may further include a transceiver 75.

The processor 71 may be referred to as a processing unit. The transceiver 75 may be referred to as a transceiver unit, a transceiver machine, a transceiver circuit, a transceiver, or the like, and is configured to implement sending and receiving functions of the communication apparatus.

If the communication apparatus is configured to implement an operation corresponding to the first network device in the embodiment shown in FIG. 3, for example, the transceiver may receive the first state information from the at least one second network device, the transceiver may further complete another corresponding communication function, and the processor is configured to complete a corresponding determining or control operation. Optionally, the memory may further store corresponding instructions. For a specific processing manner of each component, refer to related descriptions in the foregoing embodiments.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be manufactured by using various IC technologies, for example, a complementary metal oxide semiconductor (CMOS), an N-type metal-oxide-semiconductor (NMOS), P-type metal-oxide-semiconductor (PMOS), a bipolar junction transistor (BJT), a bipolar CMOS (BiCMOS), silicon germanium (SiGe), and gallium arsenide (GaAs).

Optionally, the communication apparatus may be an independent device or may be a portion of a relatively large device. For example, the device may be:
(1) an independent integrated circuit IC, a chip, or a chip system or subsystem;
(2) a set having one or more ICs, where optionally, the IC set may also include a storage component configured to store data and/or instructions;
(3) an ASIC, for example, a modem (MSM);
(4) a module that can be embedded in another device;
(5) a receiver, a terminal, a cellular phone, a wireless device, a handheld phone, a mobile unit, a network device, or the like; or
(6) another device, or the like.

Figure 14:
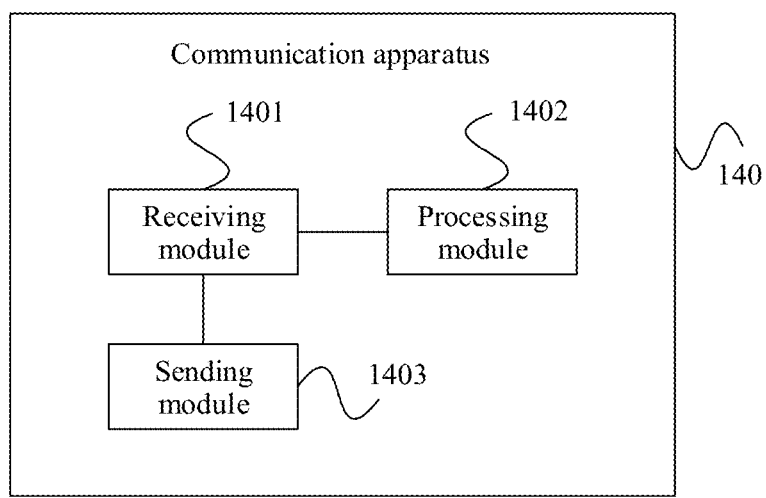
FIG. 14 is a schematic structural diagram of a communication apparatus according to an embodiment of this application.

FIG. 14 is a schematic structural diagram of a communication apparatus according to an embodiment of this application. As shown in FIG. 14, the communication apparatus 140 includes a receiving module 1401 and a processing module 1402. The receiving module 1401 is configured to receive first state information from at least one second network device, where the first state information is used to indicate whether the second network device is capable of providing a service in a next state. The processing module 1402 is configured to determine, based on at least the first state information, a network topology obtained after the first network device and the at least one second network device in the next state are networked.

In FIG. 14, further, the first state information is determined by the second network device based on at least one of an electric quantity, online user state information, load information, a signal-to-noise ratio, and a throughput that are of the second network device.

In a possible manner, when determining, based on at least the first state information, the network topology obtained after the first network device and the at least one second network device in the next state are networked, the processing module 1402 is specifically configured to determine, based on second state information and the first state information, a target network device that is in the first network device and the at least one second network device and that provides a service in the next state, where the second state information is used to indicate whether the first network device is capable of providing a service in the next state.

In another possible manner, the communication apparatus 140 further includes a sending module 1403. The sending module 1403 is configured to send the second state information to the at least one second network device, so that the at least one second network device determines, based on the first state information and the second state information, the target network device that is in the first network device and the at least one second network device and that provides the service in the next state.

Optionally, the first state information is periodically sent by the second network device, and the second state information is periodically sent by the first network device; and a sending cycle of the first state information is the same as a sending cycle of the second state information.

Optionally, the receiving module 1401 is further configured to receive third state information of the at least one second network device, where the third state information is used to indicate a current state of the second network device. When determining, based on at least the first state information, the network topology obtained after the first network device and the at least one second network device in the next state are networked, the processing module 1402 is specifically configured to determine, based on the first state information and the third state information, the network topology obtained after the first network device and the at least one second network device in the next state are networked.

Optionally, the third state information includes at least one of the following: an electric quantity, online user state information, load information, a signal-to-noise ratio, a throughput, and user state information corresponding to at least a portion of a plurality of beamforming weight directions that are of the second network device.

Optionally, when determining the network topology obtained after the first network device and the at least one second network device in the next state are networked, the processing module 1402 is specifically configured to determine a target network device that is in the first network device and the at least one second network device and that provides a service in the next state.

Optionally, the processing module 1402 is further configured to determine, based on user state information corresponding to at least a portion of a plurality of beamforming weight directions of the target network device, at least one of a beamforming weight direction, waveform information, and location information that are of the target network device in the next state.

Optionally, the sending module 1403 is further configured to: before the receiving module 1401 receives the third state information of the at least one second network device, send configuration information to the at least one second network device, where the configuration information is used to indicate the at least one second network device to send the third state information to the first network device.

Optionally, the configuration information is used to indicate a same second network device to send different third state information to the first network device.

Optionally, the configuration information is used to indicate a plurality of different second network devices to send different third state information to the first network device.

Optionally, the first network device and the at least one second network device belong to a first group.

Optionally, the first network device sends the first state information to a third network device in a second group.

Optionally, levels of network devices in the first group are the same, levels of network devices in the second group are the same, and the levels of the network devices in the first group are different from the levels of the network devices in the second group.

Optionally, a level of the first network device is adjacent to a level of the third network device.

Optionally, levels of a portion of network devices in the first group are the same, and levels of a portion of network devices in the second group are the same.

Optionally, the sending module 1403 is further configured to send the first state information to a fourth network device in the first group, where a level of the first network device is adjacent to a level of the fourth network device.

Optionally, the level of the first network device and a level of the third network device are the same.

Optionally, information exchange cycles between network devices of a same level are positively related to the level.

The communication apparatus in the embodiment shown in FIG. 14 may be configured to perform the technical solutions in the foregoing method embodiment. For an implementation principle and a technical effect thereof, refer to related descriptions in the method embodiment. Optionally, the communication apparatus may be a first network device, for example, a base station, or may be a component (for example, a chip or a circuit) of the first network device.

It should be understood that division into the foregoing modules of the communication apparatus shown in FIG. 13 and FIG. 14 is merely logical function division. During actual implementation, all or some modules may be integrated into one physical entity, or may be physically separated. In addition, all of the modules may be implemented in a form of software invoked by a processing element or in a form of hardware. Alternatively, some of the modules may be implemented in a form of software invoked by a processing element, and some of the modules may be implemented in a form of hardware. For example, the processing module may be an independently disposed processing element, or may be integrated into the communication apparatus, for example, a chip of a network device for implementation. In addition, the processing module may be stored in a memory of the communication apparatus in a form of a program to be invoked by a processing element of the communication apparatus to perform a function of each of the foregoing modules. Implementations of other modules are similar to the processing module. In addition, all or some of the modules may be integrated together, or may be implemented independently. The processing element may be an integrated circuit and has a signal processing capability. In an implementation process, steps in the foregoing method or the foregoing modules can be implemented by using a hardware integrated logical circuit in the processing element, or by using instructions in a form of software.

For example, the foregoing modules may be configured as one or more integrated circuits for implementing the foregoing method, for example, one or more application-specific integrated circuits (ASIC), one or more microprocessors (DSP), or one or more field programmable gate arrays (FPGA). For another example, when one of the foregoing modules is implemented in a form of scheduling a program by a processing element, the processing element may be a general-purpose processor, for example, a central processing unit (CPU) or another processor that can invoke the program. For another example, the modules may be integrated together and implemented in a form of a system-on-a-chip (SOC).

Figure 15:
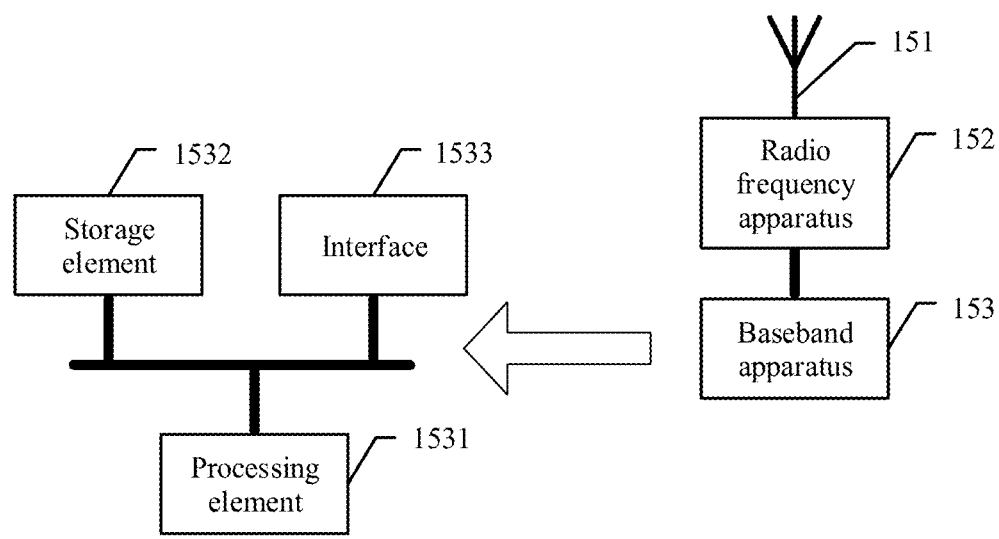
FIG. 15 is a schematic structural diagram of another communication apparatus according to an embodiment of this application.

FIG. 15 is a schematic structural diagram of still another communication apparatus according to an embodiment of this application. The communication apparatus may be specifically a base station. As shown in FIG. 15, the base station includes an antenna 151, a radio frequency apparatus 152, and a baseband apparatus 153. The antenna 151 is connected to the radio frequency apparatus 152. In an uplink direction, the radio frequency apparatus 152 receives, through the antenna 151, information sent by a terminal, and sends, to the baseband apparatus 153 for processing, the information sent by the terminal. In a downlink direction, the baseband apparatus 153 processes the information of the terminal, and sends the information to the radio frequency apparatus 152. The radio frequency apparatus 152 processes the information of the terminal, and then sends processed information to the terminal through the antenna 151.

The foregoing communication apparatus may be located at the baseband apparatus 153. In an implementation, the foregoing modules are implemented by a processing element scheduling a program. For example, the baseband apparatus 153 includes a processing element and a storage element, and the processing element 1531 invokes a program stored in the storage element 1532, to perform the method in the foregoing method embodiment. In addition, the baseband apparatus 153 may further include an interface 1533, configured to exchange information with the radio frequency apparatus 152. The interface is, for example, a common public radio interface (CPRI).

In another implementation, the foregoing modules may be configured as one or more processing elements to implement the foregoing method, and the processing elements are disposed on the baseband apparatus 153. The processing element herein may be an integrated circuit, for example, one or more ASICs, one or more DSPs, or one or more FPGAs. The integrated circuits may be integrated together to form a chip.

For example, the foregoing modules may be integrated together and implemented in a form of a system-on-a-chip (SOC). For example, the baseband apparatus 153 includes an SOC chip, configured to implement the foregoing method. The processing element 1531 and the storage element 1532 may be integrated into the chip, and the processing element 1531 invokes the program stored in the storage element 1532, to implement the foregoing method or functions of the foregoing modules. Alternatively, at least one integrated circuit may be integrated in the chip to implement the foregoing method or functions of the foregoing modules. Alternatively, the foregoing implementations may be combined, so that functions of some modules are implemented by the processing element invoking a program, and functions of some modules are implemented by using an integrated circuit.

Regardless of a manner, the communication apparatus includes at least one processing element, a storage element, and a communication interface, and the at least one processing element is configured to perform the method provided in the foregoing method embodiment. The processing element may perform some or all of the steps in the foregoing method embodiment in a first manner of executing the program stored in the storage element, or in a second manner, to be specific, a manner of using a hardware integrated logic circuit in the processing element in combination with instructions. Certainly, the method provided in the foregoing method embodiment may alternatively be performed by combining the first manner with the second manner.

The processing element herein is the same as that described above, may be a general-purpose processor, for example, a central processing unit (CPU), or may be one or more integrated circuits configured to implement the foregoing method, for example, one or more application-specific integrated circuits (ASIC), one or more microprocessors (DSP), or one or more field programmable gate arrays (FPGA). The storage element may be a memory, or may be a general name of a plurality of storage elements.

An embodiment of this application further provides a computer-readable storage medium. The computer-readable storage medium stores a computer program. When the computer program runs on a computer, the computer is enabled to perform the communication method according to the foregoing embodiments.

In addition, an embodiment of this application further provides a computer program product. The computer program product includes a computer program. When the computer program runs on a computer, the computer is enabled to perform the communication method according to the foregoing embodiments.

All or some of the foregoing embodiments may be implemented by using software, hardware, firmware, or any combination thereof. When software is used to implement the embodiments, the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. A communication method, comprising:
   receiving, by a first network device, first state information from at least one second network device, wherein the first state information indicates whether the at least one second network device is capable of providing a service in a next state;
   receiving, by the first network device, third state information of the at least one second network device, wherein the third state information indicates a current state of the at least one second network device and comprises user state information corresponding to at least a portion of a plurality of beamforming weight directions of the at least one second network device; and
   determining, by the first network device and based on at least the first state information and the third state information, a network topology after the first network device and the at least one second network device in the next state are networked, wherein the determining a network topology obtained after the first network device and the at least one second network device in the next state are networked comprises:
   determining, between the first network device and the at least one second network device, a target network device that provides a service in the next state.

2. The method according to claim 1, wherein the first state information is determined by the at least one second network device based on at least one of an electric quantity, online user state information, load information, a signal-to-noise ratio, or a throughput that are of the at least one second network device.

3. The method according to claim 1, wherein the first state information is periodically sent by the at least one second network device.

4. The method according to claim 1, wherein the third state information further comprises at least one of the following: an electric quantity, online user state information, load information, a signal-to-noise ratio, or a throughput that are of the at least one second network device.

5. The method according to claim 1, further comprising:
   determining, based on user state information corresponding to at least a portion of a plurality of beamforming weight directions of the target network device, at least one of a beamforming weight direction, waveform information, or location information that are of the target network device in the next state.

6. The method according to claim 1, wherein the first network device and the at least one second network device belong to a first group.

7. The method according to claim 6, further comprising:
   sending, by the first network device, the first state information to a third network device in a second group.

8. The method according to claim 7, wherein a level of the first network device and a level of the third network device are the same.

9. The method according to claim 8, wherein information exchange cycles between network devices of a same level are positively related to the same level.

10. A communication apparatus, which is first network device or an apparatus applicable in the first network device, comprising:
    at least one memory comprising program instructions; and at least one processor executing the program instructions to enable the apparatus to perform operations comprising:
receiving first state information from at least one second network device, wherein the first state information indicates whether the at least one second network device is capable of providing a service in a next state;
receiving third state information of the at least one second network device, wherein the third state information indicates a current state of the at least one second network device and comprises user state information corresponding to at least a portion of a plurality of beamforming weight directions of the at least one second network device; and
determining, based on at least the first state information and the third state information, a network topology after the first network device and the at least one second network device in the next state are networked, wherein the determining a network topology obtained after the first network device and the at least one second network device in the next state are networked comprises:
determining, between the first network device and the at least one second network device, a target network device that provides a service in the next state.

11. The apparatus according to claim 10, wherein the first state information is determined by the at least one second network device based on at least one of an electric quantity, online user state information, load information, a signal-to-noise ratio, or a throughput that are of the at least one second network device.

12. The apparatus according to claim 10, wherein the first state information is periodically sent by the at least one second network device.

13. The apparatus according to claim 10, wherein the third state information further comprises at least one of the following: an electric quantity, online user state information, load information, a signal-to-noise ratio, or a throughput that are of the at least one second network device.

14. The apparatus according to claim 10, wherein the operations further comprise:
determining, based on user state information corresponding to at least a portion of a plurality of beamforming weight directions of the target network device, at least one of a beamforming weight direction, waveform information, or location information that are of the target network device in the next state.

15. The apparatus according to claim 10, wherein the first network device and the at least one second network device belong to a first group.

16. The apparatus according to claim 15, wherein the operations further comprise:
sending the first state information to a third network device in a second group.

17. The apparatus according to claim 16, wherein a level of the first network device and a level of the third network device are the same.

18. The apparatus according to claim 17, wherein information exchange cycles between network devices of a same level are positively related to the same level.

* * * * *